US010904026B2

(12) United States Patent
Yoshida

(10) Patent No.: US 10,904,026 B2
(45) Date of Patent: Jan. 26, 2021

(54) INFORMATION PROCESSING APPARATUS, INFORMATION PROCESSING SYSTEM, AND INFORMATION PROCESSING METHOD

(71) Applicant: Eiichiro Yoshida, Kanagawa (JP)

(72) Inventor: Eiichiro Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/784,762

(22) Filed: Feb. 7, 2020

(65) Prior Publication Data

US 2020/0259675 A1 Aug. 13, 2020

(30) Foreign Application Priority Data

Feb. 12, 2019 (JP) .................................. 2019-022970
Jan. 15, 2020 (JP) .................................. 2020-004405

(51) Int. Cl.
*G06F 15/16* (2006.01)
*H04L 12/18* (2006.01)

(52) U.S. Cl.
CPC ...... *H04L 12/1831* (2013.01); *H04L 12/1818* (2013.01); *H04L 12/1822* (2013.01)

(58) Field of Classification Search
USPC ................................. 709/204, 202, 205, 217
See application file for complete search history.

(56) References Cited

U.S. PATENT DOCUMENTS

| 6,167,432 A * | 12/2000 | Jiang ................... H04L 12/1818 709/203 |
| 10,431,187 B2 | 10/2019 | Miki |
| 2008/0049922 A1* | 2/2008 | Karniely ............... H04L 65/403 379/205.01 |
| 2012/0151336 A1* | 6/2012 | Scherpa .............. H04L 12/1827 715/273 |
| 2015/0067044 A1* | 3/2015 | Bakaev ............... H04L 65/1059 709/204 |

FOREIGN PATENT DOCUMENTS

| JP | 2006-146415 | 6/2006 |
| JP | 2017-017668 | 1/2017 |

\* cited by examiner

*Primary Examiner* — Lan Dai T Truong
(74) *Attorney, Agent, or Firm* — Ipusa, PLLC

(57) ABSTRACT

An information processing apparatus includes processing circuitry; and a memory storing computer-executable instructions that cause the processing circuitry to create, in a web browser of a communication terminal, data of a web page for displaying the web page configured to accept a selection of a conference from a first conference list by a user; create a conference content in association with the conference selected by the user; and display, on the web browser displayed on a display device of the communication terminal, the conference content created in association with the conference selected by the user, such that the conference content is editable by the user.

6 Claims, 26 Drawing Sheets

FIG.5A

| CONTENT ID | CONTENT DATA | DISPLAY POSITION |
|---|---|---|
| | PERSONAL MEMO ID | |
| c101 | TYPE: TEXT "I"<br>FONT TYPE: aaa<br>SIZE: 20 | (960,270) |
| c102 | TYPE: IMAGE<br>FILE NAME: xxxjpeg | (200,10) |
| c103 | TYPE: VECTOR<br>VALUE DATA: ··· | (1000,500) |
| ... | ... | ... |

FIG.5B

| CONTENT ID | CONTENT DATA | DISPLAY POSITION |
|---|---|---|
| | SHARED MEMO ID | |
| c201 | TYPE: TEXT "R"<br>FONT TYPE: aaa<br>SIZE: 20 | (400,270) |
| c202 | TYPE: IMAGE<br>FILE NAME: xxxjpeg | (400,20) |
| c203 | TYPE: VECTOR<br>VALUE DATA: ··· | (120,600) |
| ... | ... | ... |

FIG.6A

| USER ID | PERSONAL MEMO ID |
|---|---|
| User-a | board1 |
| User-a | board2 |
| User-b | board33 |
| ... | ... |

FIG.6B

| PERSONAL MEMO ID | SHARED MEMO ID | MEMO DATA |
|---|---|---|
| board1 | c-boardA | IMPORTANT, PERSONAL MEMO, ... |
| board1 | c-boardA | NEED CONFIRMATION |
| ... | ... | ... |

FIG.6C

| SHARED MEMO ID | BIBLIOGRAPHIC INFORMATION OF CONFERENCE |
|---|---|
| c-boardA | DATE AND TIME: 2018/9/4<br>CONFERENCE NAME: Meeting<br>LOCATION: CONFERENCE ROOM A<br>SELF-EVALUATION: ★★★<br>... |
| ... | ... |

FIG.10

| DATE AND TIME | CONFERENCE NAME | LOCATION | PERSONAL MEMO | SHARED MEMO | SELF-EVALUATION | BIBLIOGRAPHIC INFORMATION |
|---|---|---|---|---|---|---|
| 2018-10-05 20:30 | TEST | | | | ☆☆☆☆☆ | 🗎 |
| 2018-10-05 20:30 | [PERSONAL] | | 🗎 | | ☆☆☆☆☆ | |
| 2018-10-05 10:00 | DAILY MTG | room4 | 🗎 | 🗎 | ☆☆☆☆☆ | 🗎 |
| 2018-09-05 04:00 | CONSULTATION | room2 | 🗎 | 🗎 | ★★★☆☆ | 🗎 |
| 2018-09-04 09:53 | Meeting | CONFERENCE ROOM A | 🗎 | 🗎 | ★★☆☆☆ | 🗎 |
| 2018-09-04 07:40 | BRIEFING SESSION | room3 | 🗎 | 🗎 | ★★★☆☆ | 🗎 |
| 2018-08-28 13:00 | CONSULTATION ABOUT TRAINING ORGANIZATION | room1 | ... | ... | | |

FIG.18

| FOR INFORMATION SHARING SERVICE | | FOR SCHEDULE MANAGEMENT SERVICE (s1) | | FOR SCHEDULE MANAGEMENT SERVICE (s2) | |
|---|---|---|---|---|---|
| USER ID | PASSWORD | USER ID | PASSWORD | USER ID | PASSWORD |
| User-a | aaa | s1AAA | s1aaa | s2AAA | s2aaa |
| User-b | bbb | s1BBB | s1bbb | | |
| ⋮ | ⋮ | ⋮ | ⋮ | ⋮ | ⋮ |

FIG.22

PERSONAL PORTAL

PERSONAL HISTORY  SETTING

CHARACTER SEARCH

| DATE AND TIME | CONFERENCE NAME | LOCATION | PERSONAL MEMO | SHARED MEMO | SELF-EVALUATION | BIBLIOGRAPHIC INFORMATION |
|---|---|---|---|---|---|---|
| 2019-01-10 11:00 | CENTER MANAGEMENT CONFERENCE | | ▣ | ▣ | ☆☆☆☆☆ | ▤ |
| 2018-10-05 20:30 | TEST | | ▣ | ▣ | ☆☆☆☆☆ | ▤ |
| 2018-10-05 20:30 | [PERSONAL] | room4 | ▣ | ▣ | ☆☆☆☆☆ | ▤ |
| 2018-10-05 10:00 | DAILY MTG | room2 | ▣ | ▣ | ★★★☆☆ | ▤ |
| 2018-09-05 04:00 | CONSULTATION | CONFERENCE ROOM A | ▣ | ▣ | ★★☆☆☆ | ▤ |
| 2018-09-04 09:53 | Meeting | room3 | ··· | ··· | ★★☆☆☆ | ▤ |
| 2018-09-04 07:40 | BRIEFING SESSION | room1 | | | | |
| 2018-08-28 13:00 | CONSULTATION ABOUT TRAINING ORGANIZATION | | | | | |

| SHARED MEMO ID | MEMO DATA | BIBLIOGRAPHIC INFORMATION OF CONFERENCE |
|---|---|---|
| c-boardA | IMPORTANT, IMPLEMENTATION TEST, GOOD, ··· | DATE AND TIME: 2018/9/4<br>CONFERENCE NAME: Meeting<br>LOCATION: CONFERENCE ROOM A<br>SELF-EVALUATION: ★★<br>··· |
| ··· | ··· | ··· |

INFORMATION PROCESSING APPARATUS, INFORMATION PROCESSING SYSTEM, AND INFORMATION PROCESSING METHOD

CROSS-REFERENCE TO RELATED APPLICATION

The present application is based on and claims priority under 35 U.S.C. § 119 to Japanese Patent Application No. 2019-022970, filed on Feb. 12, 2019, and Japanese Patent Application No. 2020-004405, filed on Jan. 15, 2020, the contents of which are incorporated herein by reference in their entirety.

BACKGROUND OF THE INVENTION

1. Field of the Invention

The present invention relates to an information processing apparatus, an information processing system, and an information processing method.

2. Description of the Related Art

For example, there has been a conference support system that has various functions such as a video/audio recording and reproducing function, a board writing function, and a personal memo function. The conference support system integrates respective known systems that support the conference, and manages various contents (data) created by the known systems in association with respective conferences, and the managed contents can be referred to and utilized in association with each other (see, for example, Patent Document 1).

Patent Document 1: Japanese Unexamined Patent Application Publication No. 2006-146415

SUMMARY OF THE INVENTION

According to one aspect of the present invention, there is provided an information processing apparatus including processing circuitry; and a memory storing computer-executable instructions that cause the processing circuitry to create, in a web browser of a communication terminal, data of a web page for displaying the web page configured to accept a selection of a conference from a first conference list by a user; create a conference content in association with the conference selected by the user; and display, on the web browser displayed on a display device of the communication terminal, the conference content created in association with the conference selected by the user, such that the conference content is editable by the user.

BRIEF DESCRIPTION OF THE DRAWINGS

FIGS. 5A and 5B are schematic diagrams illustrating an example of a personal memo DB and a shared memo DB according to an embodiment of the present invention;

FIGS. 6A to 6C are schematic diagrams illustrating an example of a user DB, a personal memo management DB, and a shared memo management DB according to an embodiment of the present invention;

FIG. 10 is a diagram illustrating a display example of an individual portal screen according to an embodiment of the present invention;

FIG. 18 is a configuration diagram of an example of authentication information according to an embodiment of the present invention;

FIG. 22 is a diagram illustrating a display example of a personal portal screen according to an embodiment of the present invention;

FIG. 25 is a configuration diagram of an example of a shared memo management DB according to an embodiment of the present invention.

DETAILED DESCRIPTION OF THE PREFERRED EMBODIMENTS

With respect to the conference support system disclosed in Patent Document 1, in a conference system in which information is shared by a plurality of users, there have been cases where the conference information held by each user cannot be utilized.

A problem to be addressed by an embodiment of the present invention is to provide an information processing apparatus capable of utilizing conference information held by each user in a conference system in which information is shared by a plurality of users.

Hereinafter, an embodiment of the present invention will be described in detail with reference to the drawings. The present embodiment describes an example of, but not limited to, an information sharing system for use in a conference, in which a shared memo and a personal memo can be used. The present embodiment is not limited to conferences, and can be applied to a variety of information processing systems as long as the system is applied to an event that is held by a group of people gathered together, such as seminars or lectures. Further, the present embodiment describes an example of a remote conference in which users are connected remotely; however, all of the users may be in the same room, and the users do not have to be physically distant from each other.

First Embodiment

<Overview of Information Sharing System During Conference>

Figure 1:
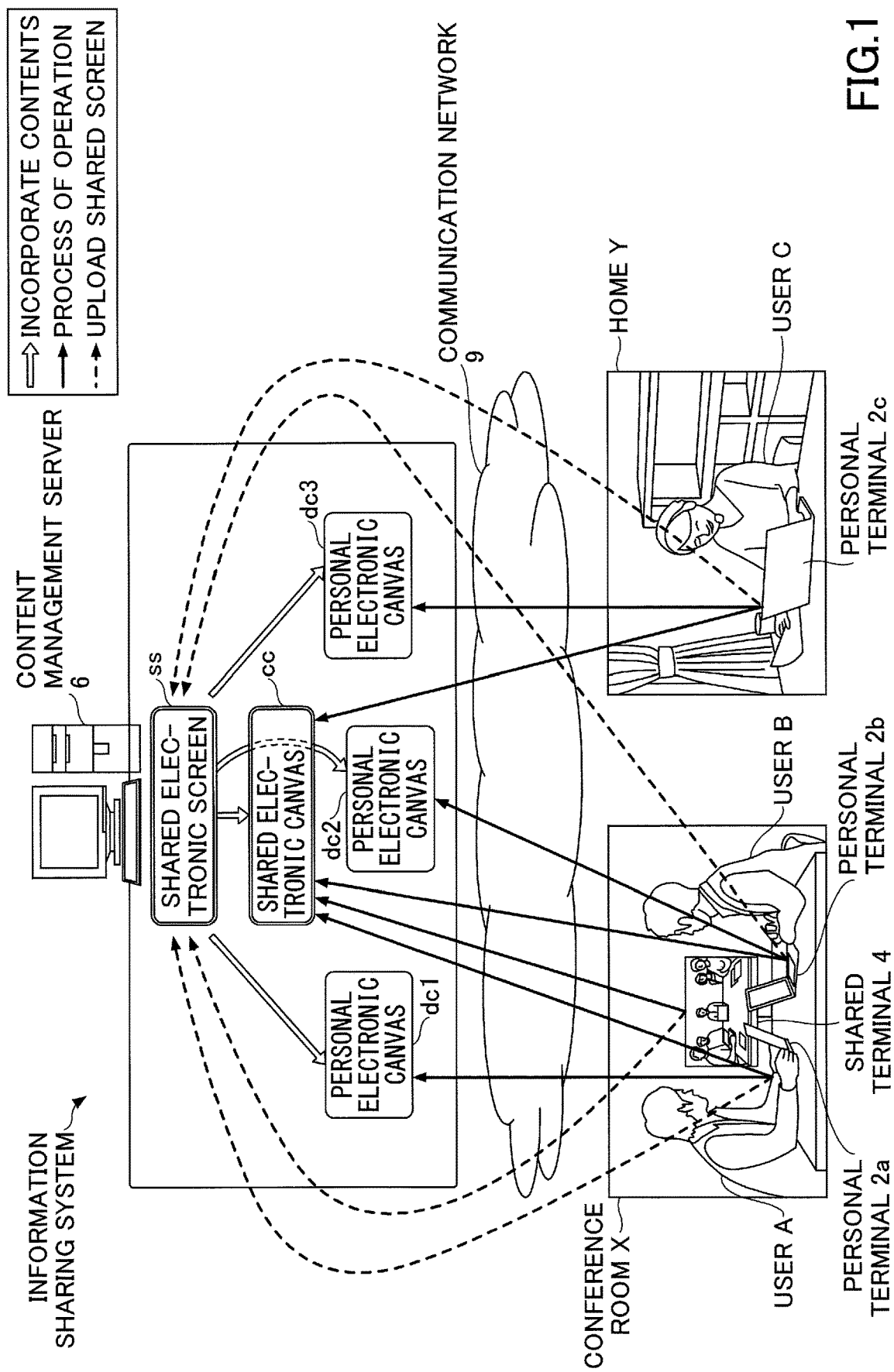
FIG. 1 is a schematic diagram of the entire information sharing system during a conference according to an embodiment of the present invention.

First, an overview of the information sharing system during a conference will be described with reference to FIG. 1. FIG. 1 is an overview diagram of the information sharing system during a conference. Here, it is illustrated that users A and B in a company's conference room X and user C in a home Y are holding a remote conference by using the information sharing system. In the conference room X, the user A brings in a personal terminal 2a, and the user B brings in a personal terminal 2b. Further, the conference room X is provided with a shared terminal 4 that can be shared by a plurality of users. Note that the shared terminal 4 is not essential. The information sharing system may have a configuration without the shared terminal 4. At the home Y, the user C brings a personal terminal 2c. Hereinafter, the term "personal terminal 2" may be used to collectively refer to the personal terminals 2a, 2b, and 2c.

The personal terminal 2 is a computer that can be used and viewed by a user individually (for exclusive-use). The shared terminal 4 is a computer that can be used and viewed by a plurality of users jointly.

The personal terminal 2 and the shared terminal 4 are, but not limited to, for example, a laptop personal computer (PC), a desktop PC, a mobile phone, a smartphone, a tablet terminal, or a wearable PC. The personal terminal 2 and the shared terminal 4 may be, for example, an image forming apparatus, a projector (PJ), an Interactive White Board (IWB: white board having an electronic blackboard function enabling mutual communication), an output device such as a digital signage, an Head Up Display (HUD) device, an industrial machine, an imaging device, a sound collecting device, a medical device, a network electrical household appliance, a game device, a Personal Digital Assistant (PDA), a digital camera, a stick PC coupled to a display, and the like. Note that the personal terminal 2 and the shared terminal 4 are examples of communication terminals (or information processing terminals).

The personal terminal 2 and the shared terminal 4 can communicate with a content management server 6 via a communication network 9 such as the Internet. The communication network 9 may be one or more Local Area Networks (LANs) inside a firewall or may include the Internet outside the firewall in addition to the LAN. The communication network 9 may also include a Virtual Private Network (VPN) and a Wide Area Ethernet (registered trademark). The communication network 9 may be either wired or wireless, or may be a combination of wired and wireless networks. Also, when connected by a mobile phone network such as 3G, Long Term Evolution (LTE), 4G, or the like, the LAN is not needed.

The content management server 6 is a computer that functions as a web server (or HTTP server) that stores and manages the content data to be transmitted to the personal terminal 2 and the shared terminal 4. The content management server 6 includes a storage unit 6000, which will be described later. In the storage unit 6000, a storage location (or storage area) for implementing a personal electronic canvas, that can only be accessed from each corresponding personal terminal 2, is formed. Specifically, only each of the personal terminals 2a, 2b, and 2c can access one of the corresponding personal electronic canvases dc1, dc2, and dc3. Hereinafter, the term "personal electronic canvas dc" may be used to collectively refer to the personal electronic canvases dc1, dc2, and dc3. The content management server 6 may support cloud computing. Cloud computing is a form of usage in which resources on a network are used without being aware of specific hardware resources.

Further, in the storage unit 6000 of the content management server 6, a storage location (or storage area) for implementing a shared electronic canvas cc that can be accessed from the respective personal terminals 2, is formed. Further, in the storage unit 6000 of the content management server 6, a storage location (or storage area) for implementing a shared electronic screen ss that can be accessed from the respective personal terminals 2, is formed.

The "electronic canvas" is not a thick fabric woven in plain weave, but a virtual space created in the storage location (or storage area) of the storage unit 6000 of the content management server 6. The electronic canvas can be accessed with a web application for an electronic canvas that includes a function for viewing and editing content, e.g., by canvas elements, JavaScript™, and the like. A web application operates by the coordination of programs in a scripting language (e.g., JavaScript (registered trademark)) running on a web browser application (hereinafter referred to as a web browser) with programs in a web server, and indicates software used in a web browser or mechanisms thereof. The personal electronic canvas dc and the shared electronic canvas cc have a finite or infinite area within the storage area of the storage unit 6000. For example, the personal electronic canvas dc and the shared electronic canvas cc may be finite or infinite in both longitudinal and lateral directions, or may be finite or infinite in one of longitudinal and lateral directions.

Further, the "electronic screen" is not a white cloth (projection screen) for projecting and viewing movies or slide images, but a virtual space created in the storage location (or storage area) of the storage unit 6000 of the content management server 6. Unlike the electronic canvas, the electronic screen is provided with a function for simply holding content data to be transmitted (distributed) to the personal terminal 2 or the shared terminal 4 and holding the previous contents until the next contents are acquired. The electronic screen can be accessed by a web application for an electronic screen that has a function of viewing content.

Further, the personal electronic canvas dc is a personal electronic space exclusively used by each user participating in a remote conference. The personal terminal 2 of each user can only access the corresponding personal electronic canvas dc and view and edit (input, delete, copy, etc.) the contents such as characters, images, etc. The shared electronic canvas cc is a shared electronic space for the respective users participating in a remote conference. Every one of the personal terminals 2 of the respective users can access the shared electronic canvas cc and view and edit contents such as characters and images.

Further, the shared electronic screen ss is a shared electronic space for the respective users participating in a remote conference. Every one of the personal terminals 2 of the respective users can access the shared electronic screen ss and view a shared screen held in the shared electronic screen ss. However, unlike the personal electronic canvas dc1 and the shared electronic canvas cc, the shared electronic screen ss has a function of simply holding content data to be transmitted (distributed) to the personal terminal 2 or the shared terminal 4 and holding the previous contents until the next contents are acquired.

For example, when content data is transmitted from the personal terminal 2*a* to the shared electronic screen ss and subsequently, content data is transmitted from the personal terminal 2*b* to the shared electronic screen ss, the content data held by the shared electronic screen ss will be the content data transmitted from the personal terminal 2*b* that is the most recently received content data.

The content management server 6 manages information such as contents that are expanded in the shared electronic screen ss, the shared electronic canvas cc, and the personal electronic canvas dc in association with each virtual room. Accordingly, even when multiple virtual rooms are managed by the content management server 6, communication of content data between different virtual rooms will not be performed.

Each personal terminal 2 may display contents of the personal electronic canvas dc, the shared electronic canvas cc, and the shared electronic screen ss in the virtual room in which the user participates, by a web application of the installed web browser.

A virtual room is created for each conference, and each user participating in the virtual room can use the shared electronic screen ss, the shared electronic canvas cc, and the personal electronic canvas dc in the corresponding virtual room, so that a conference that is similar to a real conference room can be held. By this information sharing system, users can share contents of personal materials in the virtual room, or incorporate the content of the material shared in the virtual room as a personal material.

Figure 26:
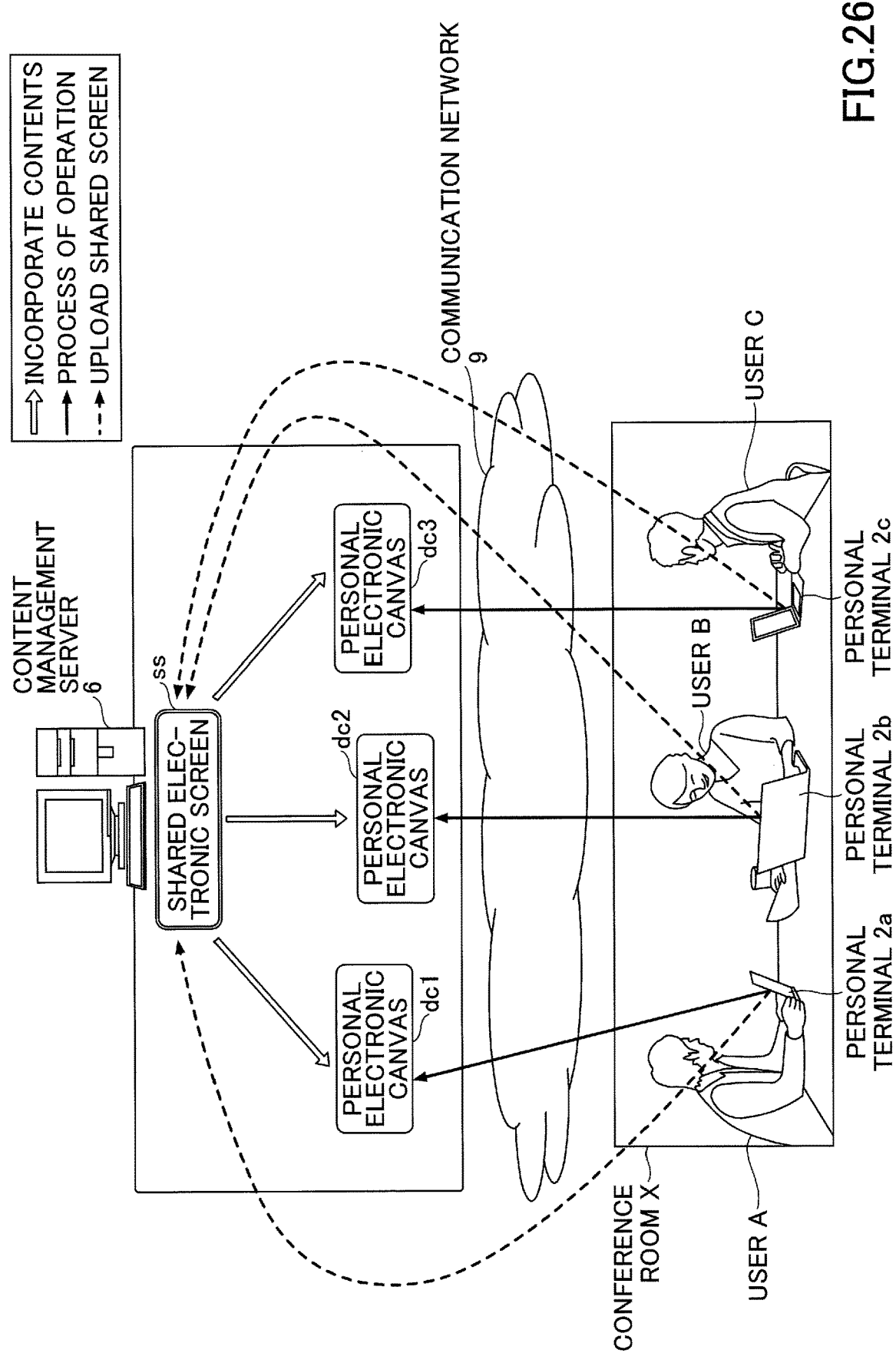
FIG. 26 is a schematic diagram of the entire information sharing system during a conference according to an embodiment of the present invention.

Note that the information sharing system of FIG. 1 is one example, and may not include any one or more of the shared electronic screen ss, the shared electronic canvas cc, and the personal electronic canvas dc. For example, the information sharing system of FIG. 26 is an example formed of the shared electronic screen ss and the personal electronic canvas dc without the shared electronic canvas cc. In the information sharing system of FIG. 26, each personal terminal 2 may display the contents of the personal electronic canvas dc and the shared electronic screen ss in the virtual room in which the user participates, by the web application of the installed web browser.

<Overview of Personal Portal in Information Sharing System>

Figure 2:
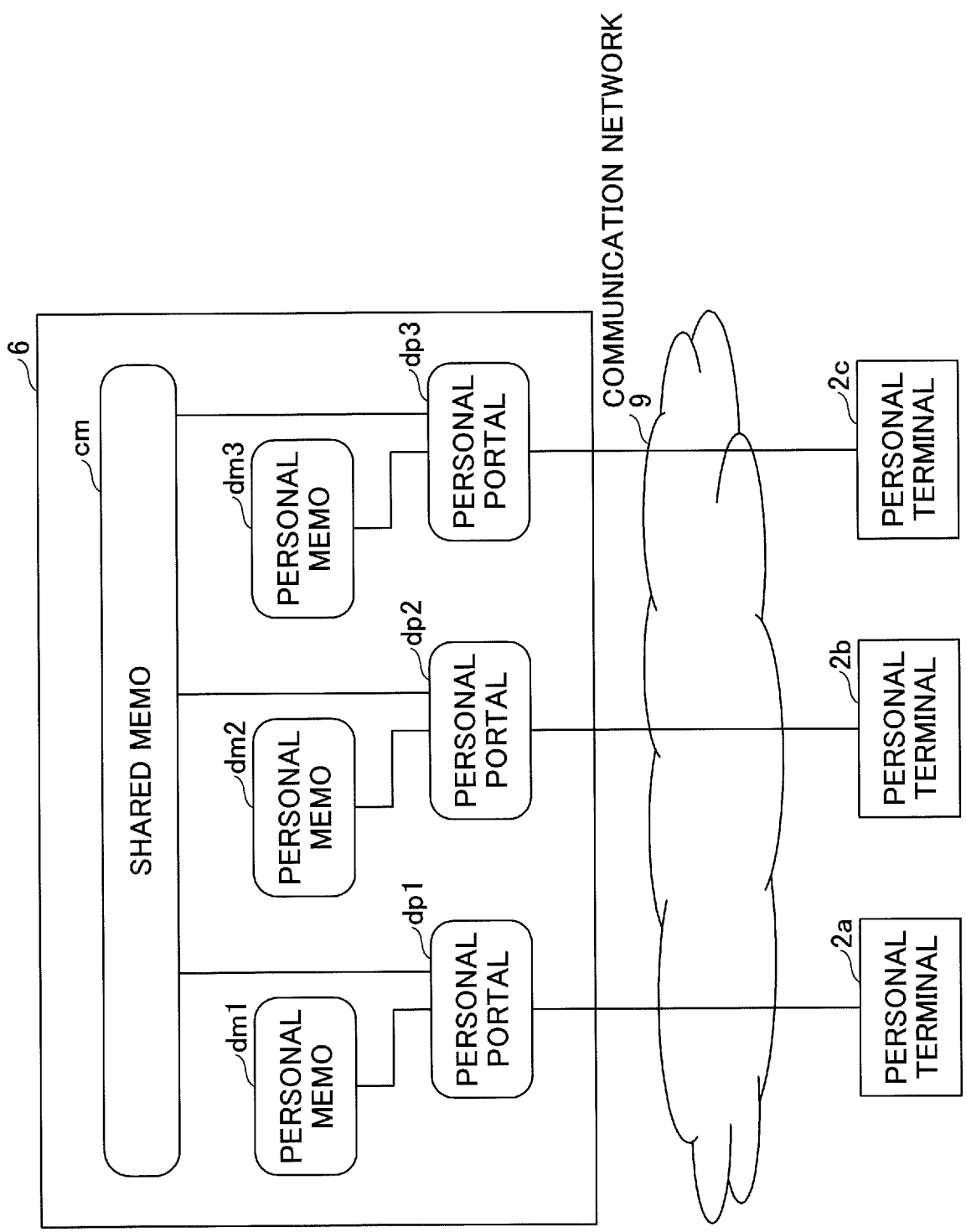
FIG. 2 is a diagram illustrating an overview of a personal portal in the information sharing system according to an embodiment of the present invention.

Next, an outline of a personal portal will be described with reference to FIG. 2. FIG. 2 is a diagram illustrating an example of an overview of a personal portal in the information sharing system. The content management server 6 generates data of personal portal screens dp1, dp2, and dp3, each being exclusively used by one of the personal terminals 2, and displays the generated data on each of the corresponding personal terminals 2. Hereinafter, the term "personal portal screen dp" may be used to collectively refer to the personal portal screens dp1, dp2, and dp3.

The content management server 6 stores and manages a shared memo cm, which is a content edited during the conference in the shared electronic canvas cc of FIG. 1, and personal memos dm1, dm2, and dm3, which are contents respectively edited by the personal electronic canvases dc. Hereinafter, the term "personal memo dm" may be used to collectively refer to the personal memos dm1, dm2, and dm3. Each user can access the personal portal screen dp exclusively used by the corresponding personal terminal 2 to display a list of conferences including the conference in which the user operating the personal terminal 2 has participated and a conference selected from conferences to be attended and for which the "personal memo dm" and the like has been created as described below.

The user can display the shared memo cm, the personal memo dm, and bibliographic information of the conference of each conference, from the list of conferences displayed on the personal portal screen dp, as described below. Accordingly, the user can easily display the shared memo cm, the personal memo dm, and bibliographic information of the desired conference, when reviewing the contents of the conference and the like. Further, each user may access the personal portal screen dp exclusively used by each of the personal terminals 2 and perform a keyword (character) search with respect to the desired conference based on the list of conferences of the user operating the personal terminal 2, as described below.

Note that the search targets of character search include bibliographic information of the conference, text data and handwritten characters included in the personal memo dm, evaluation of conferences by users, and the like. Note that the bibliographic information of the conference is included in the conference information. The conferences information is information that indicates a particular conference or information that is linked to a particular conference. The conferences information includes the bibliographic information of the conference, the identity (ID) of the personal memo or the shared memo, and the ID of the virtual room. Other information may be included, such as information created when accessing a connection address, information generated when creating a virtual room, the actual start date and time, and the like. The bibliographic information of a conference includes the name of the conference, the location, the date and time, a participant name, a participant ID, etc.

<Hardware Configuration>

Figure 3:
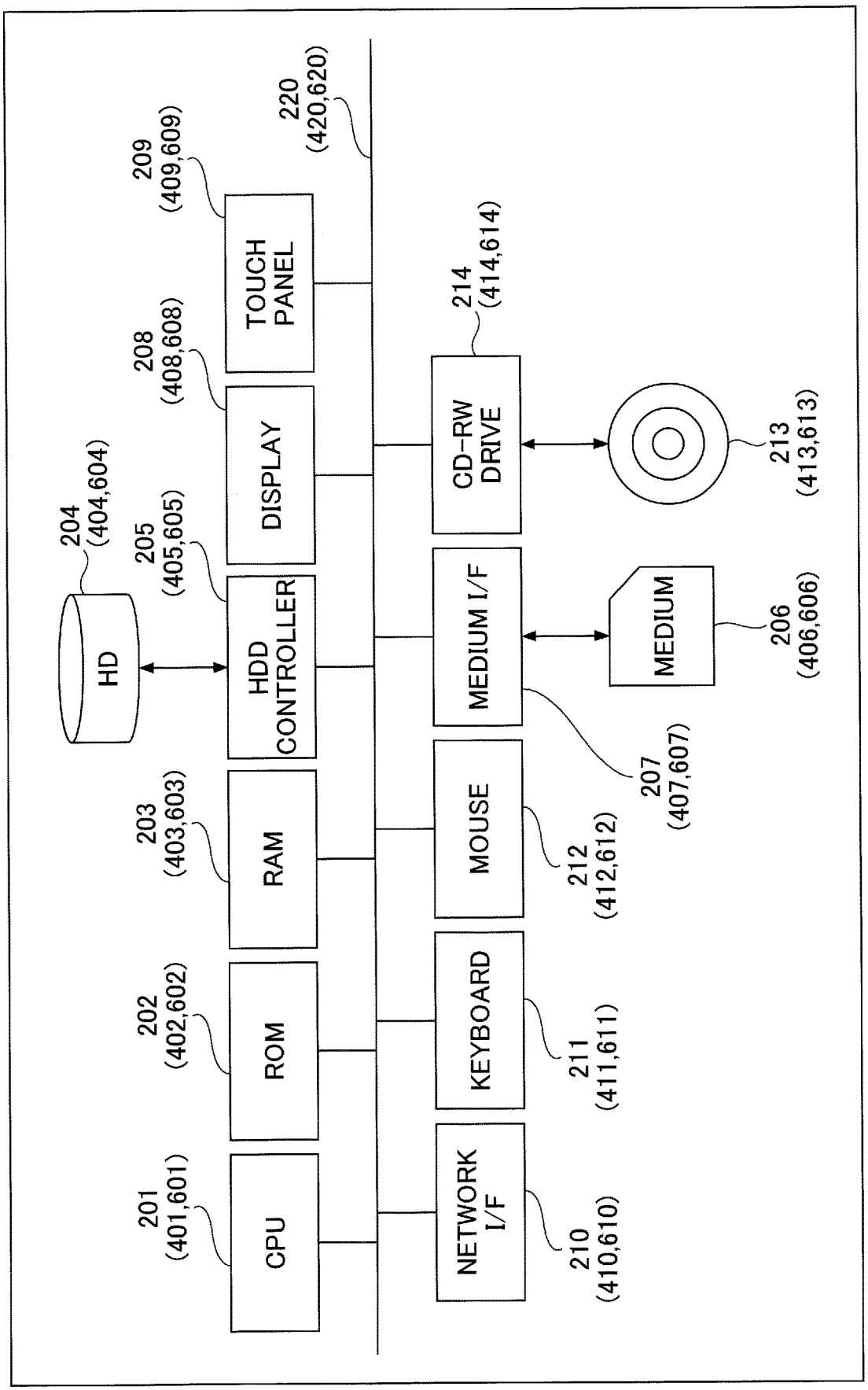
FIG. 3 is a hardware configuration diagram of each terminal and server forming the information sharing system according to an embodiment of the present invention.

A hardware configuration of each terminal and server forming the information sharing system will be described with reference to FIG. 3. FIG. 3 is a hardware configuration diagram illustrating each terminal and server forming the information sharing system.

<<Hardware Configuration of Personal Terminal and Shared Terminal>>

As illustrated in FIG. 3, the personal terminal 2 includes a Central Processing Unit (CPU) 201, a Read-Only Memory (ROM) 202, a Random Access Memory (RAM) 203, a Hard Disk (HD) 204, a Hard Disk Drive (HDD) controller 205, a recording medium 206, a medium interface (I/F) 207, a display 208, a touch panel 209, a network I/F 210, a keyboard 211, a mouse 212, a Compact Disc-ReWritable (CD-RW) drive 214, and a bus line 220.

Among these, the CPU 201 controls the operation of the entire personal terminal 2. The ROM 202 stores a program used to drive the CPU 201. The RAM 203 is used as a work area of the CPU 201. The HD 204 stores various kinds of data such as a program. The HDD controller 205 controls the reading or writing of various kinds of data with respect to the HD 204 according to the control of the CPU 201. The medium I/F 207 controls the reading or writing (storage) of data with respect to the recording medium 206, such as a flash memory.

The display 208 displays various kinds of information such as cursors, menus, windows, characters, or images. The touch panel 209 is a type of input means for operating the personal terminal 2 by pressing the display 208 by the user. The network I/F 210 is an interface for performing data communication using the communication network 9. The keyboard 211 is a type of input means with a plurality of keys for input of characters, values, various instructions, and the like. The mouse 212 is a type of input means for selecting and executing various instructions, selecting a processing target, moving the cursor, and the like. The CD-RW drive 214 controls the reading or writing of various kinds of data with respect to a CD-RW 213 as an example of removable recording medium.

The shared terminal 4 includes a CPU 401, a ROM 402, a RAM 403, a HD 404, a HDD controller 405, a recording medium 406, a medium I/F 407, a display 408, a touch panel 409, a network I/F 410, a keyboard 411, a mouse 412, a CD-RW drive 414, and a bus line 420. These have similar configurations to those described above (the CPU 201, the ROM 202, the RAM 203, the HD 204, the HDD controller 205, the recording medium 206, the medium I/F 207, the display 208, the touch panel 209, the network I/F 210, the keyboard 211, the mouse 212, the CD-RW drive 214, and the bus line 220), and, therefore, descriptions of these elements are omitted.

<<Hardware Configuration of Content Management Server, Schedule Management Server>>

The content management server 6 and a schedule management server 8 to be described later include a CPU 601, a ROM 602, a RAM 603, a HD 604, a HDD controller 605, a recording medium 606, a medium I/F 607, a display 608, a touch panel 609, a network I/F 610, a keyboard 611, a mouse 612, a CD-RW drive 614, and a bus line 620. These have similar configurations to those described above (the CPU 201, the ROM 202, the RAM 203, the HD 204, the HDD controller 205, the recording medium 206, the medium I/F 207, the display 208, the touch panel 209, the network I/F 210, the keyboard 211, the mouse 212, the CD-RW drive 214, and the bus line 220), and, therefore, descriptions of these elements are omitted. Note that the content management server 6 does not have to include the touch panel 609.

Further, a Digital Versatile Disc-Recordable (DVD-R) drive and the like may be used instead of a CD-RW drive. Each of the personal terminal 2, the shared terminal 4, the content management server 6, and the schedule management server 8 may be formed by a single computer, or may be formed by a plurality of computers randomly allocated by dividing the units (functions, means, or storage units).

<Functional Configuration>

Figure 4:
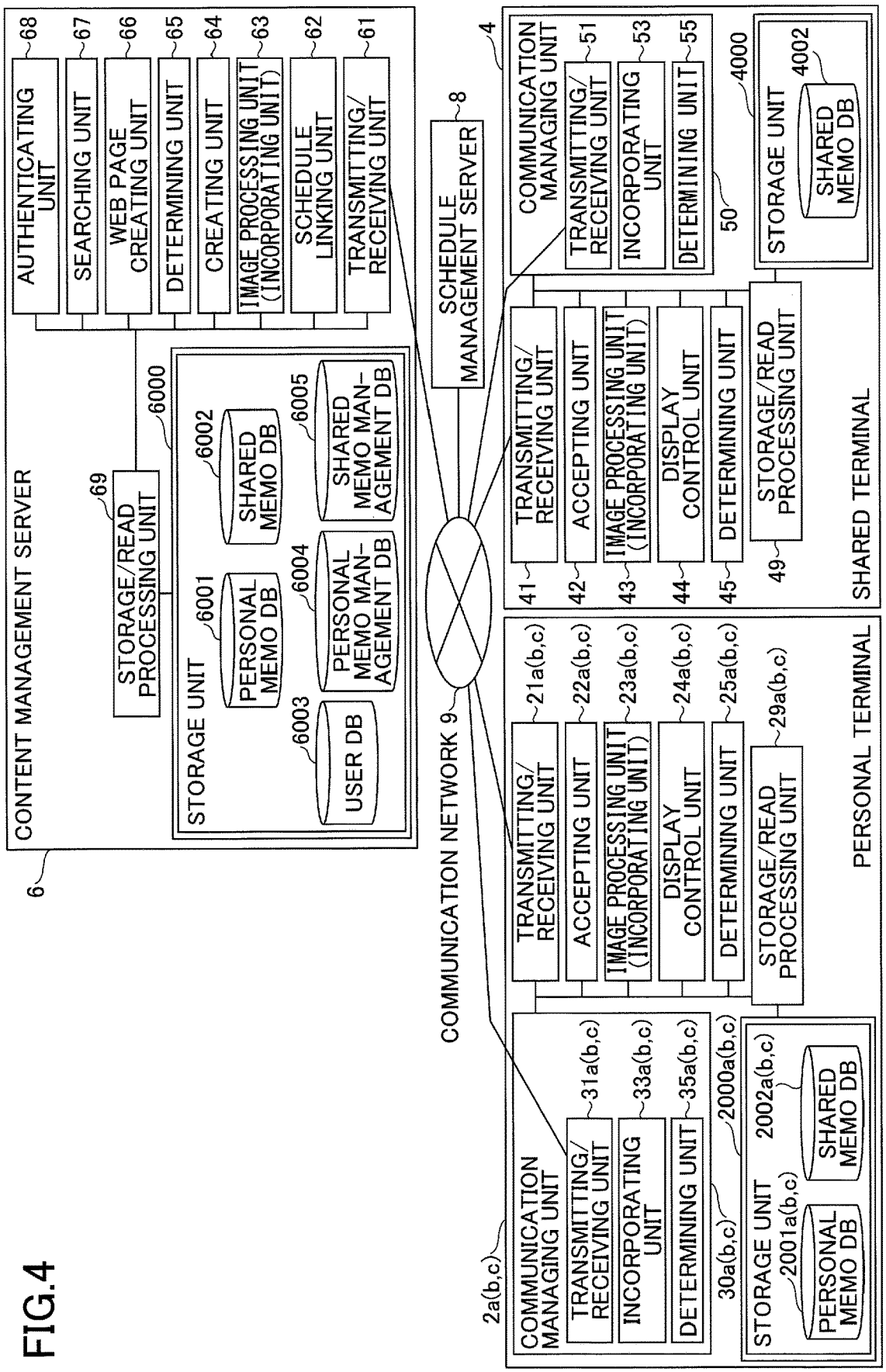
FIG. 4 is a functional block diagram of each terminal and server forming the information sharing system according to an embodiment of the present invention.

A functional configuration of each terminal and server forming the information sharing system will be described with reference to FIG. 4. FIG. 4 is a functional block diagram illustrating each terminal and server forming the information sharing system.

<<Functional Configuration of Personal Terminal>>

First, the functional configuration of the personal terminal 2a will be described. As illustrated in FIG. 4, the personal terminal 2a includes a transmitting/receiving unit 21a, an accepting unit 22a, an image processing unit 23a, a display control unit 24a, a determining unit 25a, a storage/read processing unit 29a, and a communication managing unit 30a. Each of these units is a function or means for functioning implemented by operating one of the elements illustrated in FIG. 3 according to commands from the CPU 201 according to a program loaded from the HD 204 to the RAM 203. The personal terminal 2a includes a storage unit 2000a formed by the RAM 203 and the HD 204 illustrated in FIG. 3.

Note that the transmitting/receiving unit 21a, the accepting unit 22a, the image processing unit 23a, the display control unit 24a, the determining unit 25a, and the storage/read processing unit 29a are implemented by a web browser (a web application thereof) for displaying the operation display area to be described later. The communication managing unit 30a is implemented by an exclusive-use communication application.

(Personal Memo DB)

FIG. 5A is a configuration diagram of an example of a personal memo DB. A personal memo DB 2001a, which is illustrated in FIG. 5A, is formed in the storage unit 2000a of the personal terminal 2a. The personal memo DB 2001a is created in the cache of the web browser and thus exists only while the web browser is running.

The data managed by the personal memo DB 2001a is the same as the data for each personal terminal 2 managed by a personal memo DB 6001 in the content management server 6 which will be described later. For example, the personal terminal 2a acquires data for the personal terminal 2a from the data of each personal terminal 2 managed by the content management server 6, and manages the acquired data by the personal memo DB 2001a.

In the personal memo DB 2001a, a set of a content ID, content data, and a display position of content data are managed in association with a personal memo ID for identifying the personal memo of the personal electronic canvas dc. Among these, the content ID is an example of content identification information for identifying each content. The content data is data such as text data, images such as screen capture images, vector data obtained by drawing, etc. The display position of the content data indicates the display position of the content in the personal electronic canvas dc.

(Shared Memo DB)

FIG. 5B is a configuration diagram of an example of a shared memo DB. A shared memo DB 2002a, as illustrated in FIG. 5B, is formed in the storage unit 2000a of the personal terminal 2a. The shared memo DB 2002a is created in the cache of the web browser and thus exists only while the web browser is running.

The data managed by the shared memo DB 2002a is the same as the data managed by a shared memo DB 6002 in the content management server 6 which will be described later. For example, the personal terminal 2a acquires the data managed by the content management server 6 and manages the acquired data by the shared memo DB 2002*a*.

In the shared memo DB 2002*a*, a set of a content ID, content data, and a display position of content data are managed in association with a shared memo ID for identifying the shared memo of the shared electronic canvas cc. The content ID is an example of content identification information for identifying each content. The content data is data such as text data, images such as screen capture images, vector data obtained by drawing, etc. The display position of the content data indicates the display position of the content in the shared electronic canvas cc.

(Functional Configuration)

Next, the functional configuration of the personal terminal 2*a* will be described in detail. The transmitting/receiving unit 21*a* transmits and receives various kinds of data (or information) with other terminals, devices, or servers via the communication network 9. For example, the transmitting/receiving unit 21*a* receives content data described in Hyper Text Markup Language (HTML), Cascade Style Sheet (CSS), and JavaScript (registered trademark), from the content management server 6. The transmitting/receiving unit 21*a* transmits the operation information input by the user to the content management server 6.

The accepting unit 22*a* accepts various kinds of input information from the keyboard 211 and the mouse 212 input by a user. The image processing unit 23*a* performs, for example, a process such as creating vector data (or stroke data) according to drawing by the user. Further, the image processing unit 23*a* has a function as an incorporating unit. For example, the image processing unit 23*a* captures the screen of an operation display area 130 to be described later to incorporate the image data of the screen.

The display control unit 24*a* displays various images and the contents of the screen on the display 208. The determining unit 25*a* makes various determinations. The storage/read processing unit 29*a* is executed by a command from the CPU 201 and by the HDD controller 205, the medium I/F 207, and the CD-RW drive 214 illustrated in FIG. 3, and performs processes for storing various kinds of data in the storage unit 2000*a*, the recording medium 206, and the CD-RW 213, and for reading various kinds of data from the storage unit 2000*a*, the recording medium 206, and the CD-RW 213.

The communication managing unit 30*a* is implemented mainly by a command from the CPU 201 illustrated in FIG. 3, and performs data input/output with the transmitting/receiving unit 21*a* and the like. The communication managing unit 30*a* further includes a transmitting/receiving unit 31*a*, an incorporating unit 33*a*, and a determining unit 35*a*.

Among these, the transmitting/receiving unit 31*a* transmits and receives various kinds of data (or information) with the content management server 6 via the communication network 9, independently of the transmitting/receiving unit 21*a*. The incorporating unit 33*a* basically has the same function as an incorporating unit of the image processing unit 23*a*. For example, the incorporating unit 33*a* captures the screen of the operation display area 130 to be described later to incorporate the image data of the screen. The determining unit 35*a* makes various determinations and determines, for example, whether the operation display area 130 for the shared electronic screen ss is displayed on the display 208 of the personal terminal 2*a*. Note that the functional configurations of the personal terminals 2*b* and 2*c* are the same as the functional configurations of the personal terminal 2*a*, and, therefore, descriptions thereof will be omitted.

<<Functional Configuration of Shared Terminal>>

Next, a functional configuration of the shared terminal 4 will be described. As illustrated in FIG. 4, the shared terminal 4 includes a transmitting/receiving unit 41, an accepting unit 42, an image processing unit 43, a display control unit 44, a determining unit 45, a storage/read processing unit 49, and a communication managing unit 50. Each of these units is a function or means for functioning implemented by operating one of the elements illustrated in FIG. 3 by commands from the CPU 401 according to a program loaded from the HD 404 into the RAM 403.

The shared terminal 4 includes a storage unit 4000 formed by the RAM 403 and the HD 404 illustrated in FIG. 3. The transmitting/receiving unit 41, the accepting unit 42, the image processing unit 43, the display control unit 44, the determining unit 45, the storage/read processing unit 49, the communication managing unit 50, and the storage unit 4000 in the shared terminal 4 are the same as the transmitting/receiving unit 21*a*, the accepting unit 22*a*, the image processing unit 23*a*, the display control unit 24*a*, the determining unit 25*a*, the storage/read processing unit 29*a*, the communication managing unit 30*a*, and the storage unit 2000*a* in the personal terminal 2*a*, respectively, and, therefore, descriptions thereof will be omitted. The communication managing unit 50 includes a transmitting/receiving unit 51, an incorporating unit 53, and a determining unit 55; however, these have the same functions as the transmitting/receiving unit 31*a*, the incorporating unit 33*a*, and the determining unit 35*a*, respectively, and, therefore, descriptions thereof will be omitted.

Further, in the storage unit 4000 of the shared terminal 4, a shared memo DB 4002 is formed. The shared memo DB 4002 has the same data structure as the shared memo DB 2002*a* of the personal terminal 2*a*, and, therefore, descriptions thereof will be omitted.

Note that the transmitting/receiving unit 41, the accepting unit 42, the image processing unit 43, the display control unit 44, the determining unit 45, and the storage/read processing unit 49 are implemented by a web browser (a web application thereof) that displays the operation display area as described below. The communication managing unit 50 is implemented by an exclusive-use communication application.

<<Functional Configuration of Content Management Server>>

Next, the functional configuration of the content management server 6 will be described. As illustrated in FIG. 4, the content management server 6 includes a transmitting/receiving unit 61, a schedule linking unit 62, an image processing unit 63, a creating unit 64, a determining unit 65, a web page creating unit 66, a searching unit 67, an authenticating unit 68, and a storage/read processing unit 69. Each of these units is a function or means for functioning implemented by operating one of the elements illustrated in FIG. 3 by commands from the CPU 601 according to a program loaded from the HD 604 to the RAM 603. The content management server 6 includes a storage unit 6000 formed by the RAM 603 and the HD 604 illustrated in FIG. 3.

(Functional Configuration)

Next, the functional configuration of the content management servers 6 will be described in detail. The transmitting/receiving unit 61 transmits and receives various kinds of data (or information) with other terminals, devices, or servers via the communication network 9. The schedule linking unit 62 acquires schedule information including bibliographic information of a conference in which a user participates from the schedule management server 8 coupled to the communication network 9 to transmit and receive various kinds of data (or information). The schedule management server 8 stores schedule information (conference (list) information) for each user (for each user ID).

The image processing unit 63 functions as an incorporating unit and captures the screen with respect to the shared electronic canvas cc, which will be described later, to incorporate the image data of the screen. The creating unit 64 creates a unique content ID, a personal memo ID, a shared memo ID, and the like. The determining unit 65 determines whether the content ID, the personal memo ID, the shared memo ID, the user ID, and the like are received by the transmitting/receiving unit 61.

The web page creating unit 66 creates data of a web page to be displayed on a web browser of the personal terminal 2 and the shared terminal 4. The searching unit 67 accepts a search request from a personal portal screen described later displayed on the web browser of the personal terminal 2 and the shared terminal 4, and performs searching according to the search request. Further, the authenticating unit 68 performs a process of authenticating the user. The authenticating unit 68 may be included in a device other than the content management server 6, and for example, an authentication server coupled to the communication network 9 may be used.

The storage/read processing unit 69 is executed by a command from the CPU 601, the HDD controller 605, the medium I/F 607, and the CD-RW drive 614 illustrated in FIG. 3, and performs a process for storing various kinds of data in the storage unit 6000, the recording medium 606, and the CD-RW 613, and performs a process for reading various kinds of data from the storage unit 6000, the recording medium 606, and the CD-RW 613.

Further, the personal memo DB 6001, the shared memo DB 6002, a user DB 6003, a personal memo management DB 6004, and a shared memo management DB 6005 are formed in the storage unit 6000 of the content management server 6. The personal memo DB 6001 and the shared memo DB 6002 have the same data structure as the personal memo DB 2001a and the shared memo DB 2002a, and, therefore, descriptions thereof will be omitted. However, the personal memo DB 6001 includes all of the data of the personal memo DBs 2001a, 2001b, and 2001c. Further, the shared memo DB 6002 includes all of the data of the shared memo DBs 2002a, 2002b, and 2002c and the shared memo DB 4002. The user DB 6003, the personal memo management DB 6004, and the shared memo management DB 6005 are respectively configured as illustrated in FIGS. 6A to 6C, for example.

Note that the data described above may be stored in a separate server other than the content management server 6. In this case, with respect to the timing of data acquisition and transmission, the data may be obtained from a separate server each time a request for data acquisition and transmission is made from the personal terminal 2, or the data may be stored in the content management server 6 during a conference or while each board is viewed by a user, and may be deleted from the content management server 6 after the end of the conference or after the end of the viewing (or after a certain period of time) and may be sent to a separate server.

(User DB)

FIG. 6A is a configuration diagram of an example of a user DB. In the storage unit 6000 of the content management server 6, the user DB 6003 as illustrated in FIG. 6A is formed. In the user DB 6003, a personal memo ID is managed in association with a user ID for identifying a user (an example of user identification information). When the user ID of the user operating the personal terminal 2 can be identified by the user DB 6003 of FIG. 6A, the user's personal memo ID can be identified.

(Personal Memo Management DB)

FIG. 6B is a configuration diagram of an example of a personal memo management DB. In the storage unit 6000 of the content management server 6, the personal memo management DB 6004 as illustrated in FIG. 6B is formed. In the personal memo management DB 6004, a set of a shared memo ID and memo data is managed in association with a personal memo ID for identifying a personal memo. The memo data is text data included in the personal memo dm described in the personal electronic canvas dc by the user or text data extracted from handwritten characters by optical character recognition.

When the personal memo ID is identified by the personal memo management DB 6004 of FIG. 6B, it is possible to identify the shared memo ID of a shared memo cm described in the shared electronic canvas cc by the user in the same conference and the text data representing the contents of the characters described in the personal electronic canvas dc by the user in the conference.

(Shared Memo Management DB)

FIG. 6C is a configuration diagram of an example of a shared memo management DB. In the storage unit 6000 of the content management server 6, the shared memo management DB 6005 as illustrated in FIG. 6C is formed. The shared memo management DB 6005 manages the bibliographic information of a conference by associating the bibliographic information with a shared memo ID for identifying a shared memo. The bibliographic information of the conference is the bibliographic information of a conference in which the user has described the shared memo cm in the shared electronic canvas cc. When the shared memo ID is identified by the shared memo management DB 6005 illustrated in FIG. 6C, the bibliographic information of the conference can be identified.

Accordingly, according to the user DB 6003, the personal memo management DB 6004, and the shared memo management DB 6005 illustrated in FIGS. 6A to 6C, the bibliographic information of the conference in which the user has participated and the personal memo dm and the shared memo cm of the conference can be identified from the user ID of the user operating the personal terminal 2.

Note that each of the above-described programs may be recorded in a recording medium such as a compact disc recordable (CD-R) or a digital versatile disc recordable (DVD-R) and may be distributed domestically or overseas.

Display Example of Operation Display Area

Next, a display example of each operation display area will be described with reference to FIGS. 7 to 9. The operation display area is an area on a screen for displaying information to be presented to the user or for accepting an operation from the user by a Graphical User Interface (GUI), and is a display form of a web browser or application software. An operation display area 110 represents any area in the personal electronic canvas dc. An operation display area 120 represents any area in the shared electronic canvas cc. The operation display area 130 represents any area in the shared electronic screen ss.

Figure 7:
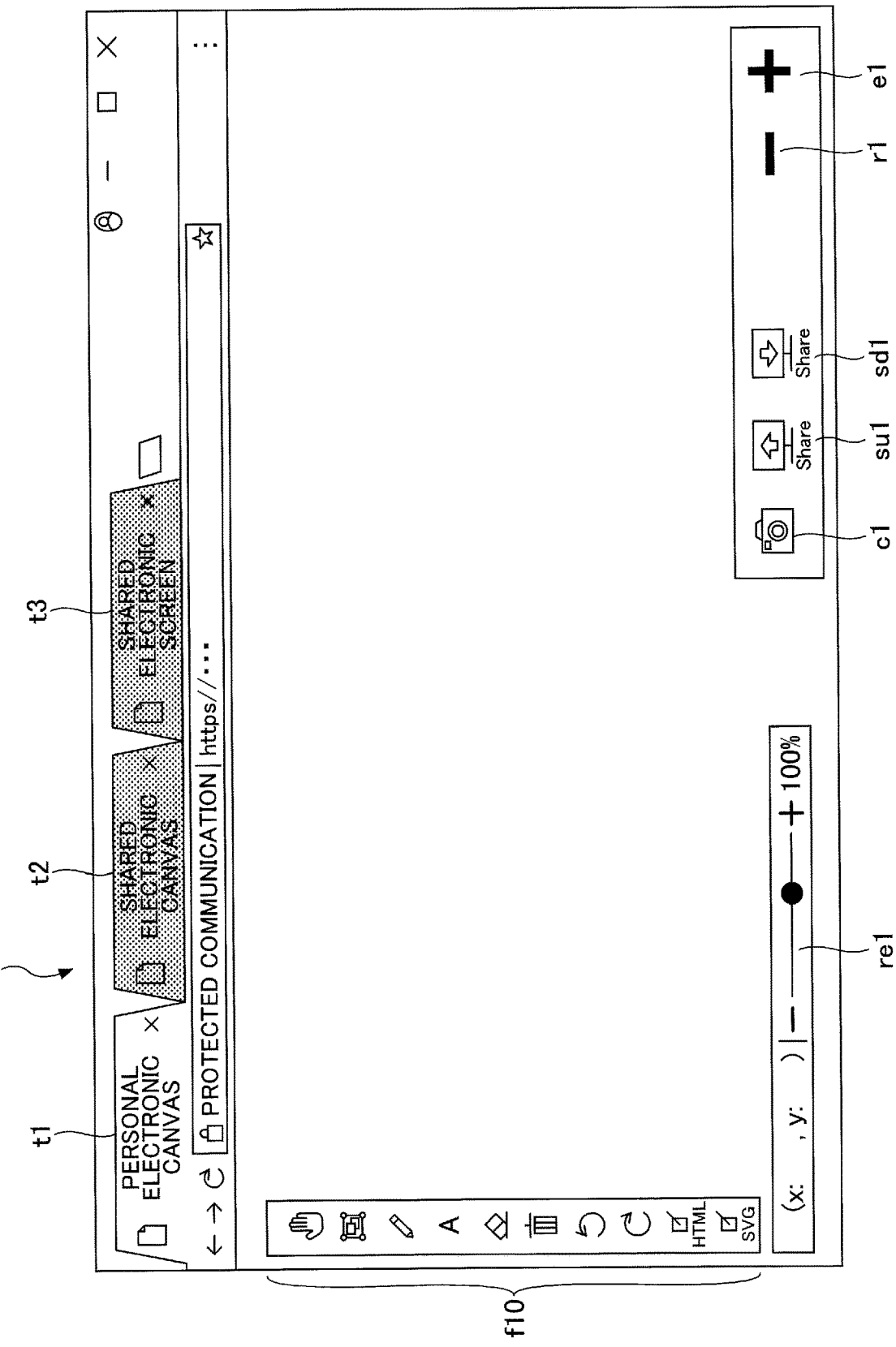
FIG. 7 is a diagram illustrating a display example of an operation display area for displaying a personal electronic canvas according to an embodiment of the present invention.

FIG. 7 is a diagram illustrating a display example of an operation display area for displaying a personal electronic canvas. As illustrated in FIG. 7, the operation display area 110 for displaying the personal electronic canvas dc is displayed as the user selects a tab t1 of the "personal electronic canvas" among the three tabs t1 to t3 at the top.

Further, on the left side of the operation display area 110, a functional icon unit f10, including various functional icons such as screen movement and drawing pens and the like, is displayed. At the lower left of the operation display area 110, a slide bar rel for specifying a step-by-step reduction or enlargement of displayed characters and the like, is displayed. Further, at the lower right of the operation display area 110, a capture button c1, an upload share button su1, a download share button sd1, a minus button r1, and a plus button e1 are displayed.

Among these, the capture button c1 is a button for capturing a screen displayed on the operation display area 130 for the shared electronic screen ss by the incorporating unit 33*a* and the like, and for incorporating and displaying the captured screen in the operation display area 110 for the personal electronic canvas dc. That is, the capturing of the screen of the operation display area 130 for the shared electronic screen ss is started by pressing the capture button c1 in the operation display area 110 for the personal electronic canvas dc in which the image data is to be incorporated. Note that here, the capture button c1 is represented by an icon having the shape of a camera.

The upload share button su1 is a button for uploading the image data of the entire screen or the image data of a selected particular window displayed on the display 208 of the personal terminal 2, to the content management server 6, and loading the image data to the shared electronic screen ss. The download share button sd1 is a button for downloading the image data loaded in the shared electronic screen ss from the content management server 6 and displaying the image data on the operation display area 110 for the personal electronic canvas dc. The minus button r1 is a button for reducing the ratio of the operation display area 110 relative to the display 208. The plus button e1 is a button for increasing the ratio of the operation display area 110 relative to the display 208.

Figure 8:
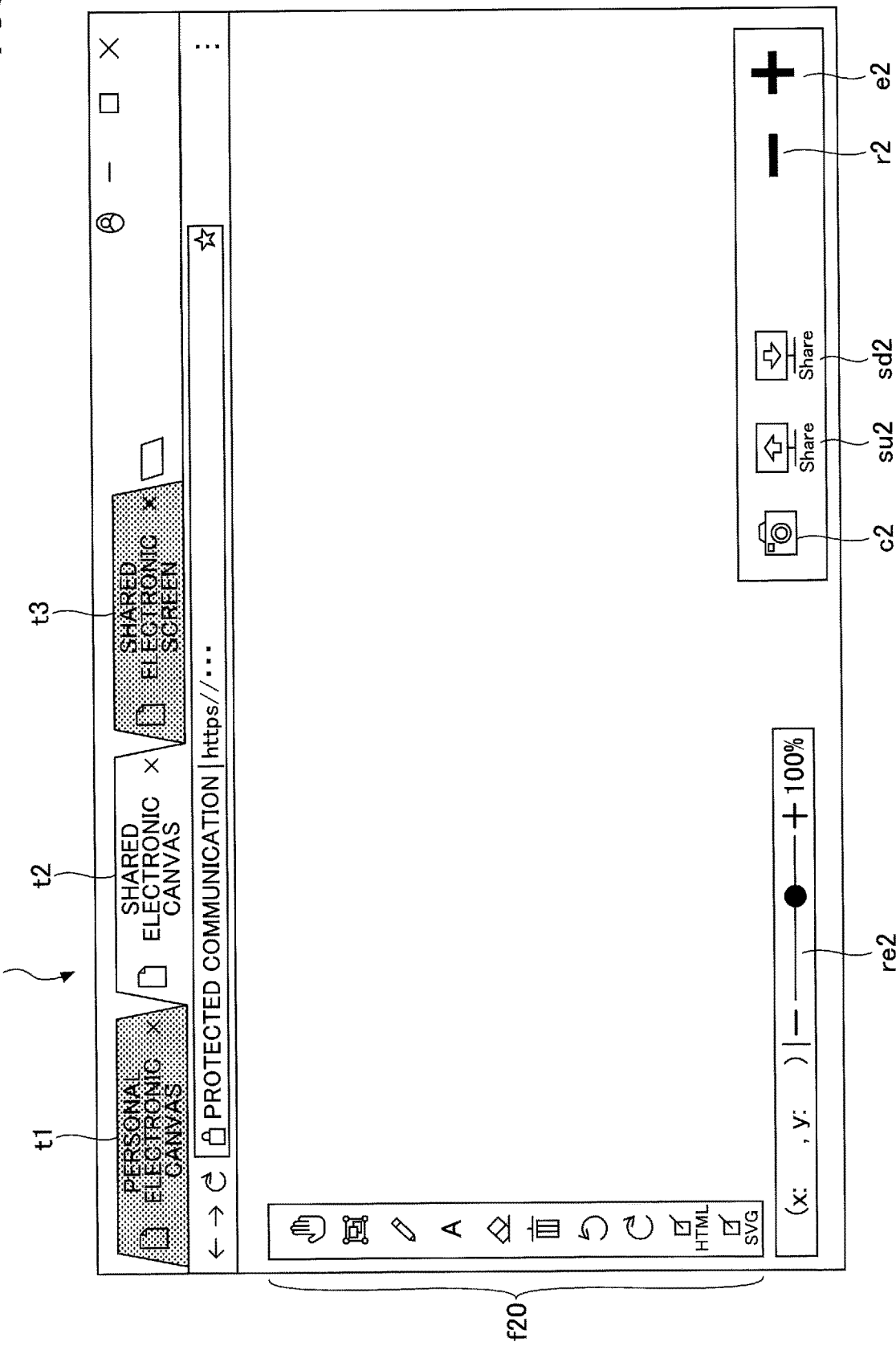
FIG. 8 is a diagram illustrating a display example of an operation display area for displaying a shared electronic canvas according to an embodiment of the present invention.

FIG. 8 is a diagram illustrating a display example of an operation display area for displaying a shared electronic canvas. As illustrated in FIG. 8, the operation display area 120 for displaying the shared electronic canvas cc is displayed as the user selects the tab t2 of the "shared electronic canvas" among the three tabs t1 to t3 at the top.

Further, on the left side of the operation display area 120, a functional icon unit f20, including various functional icons such as screen movement and drawing pens and the like, is displayed. At the lower left of the operation display area 120, a slide bar ret for specifying a step-by-step reduction or enlargement of displayed characters and the like, is displayed. Further, at the lower right of the operation display area 120, a capture button c2, an upload share button su2, a download share button sd2, a minus button r2, and a plus button e2 are displayed.

Among these, the capture button c2 is a button for capturing a screen displayed on the operation display area 130 for the shared electronic screen ss by the incorporating unit 33*a* and the like and for incorporating and displaying the screen in the operation display area 120 for the shared electronic canvas cc. That is, the capturing of the screen of the operation display area 130 for the shared electronic screen ss is started by pressing the capture button c2 of the operation display area 120 for the shared electronic canvas cc to which the image data is to be incorporated. Note that here, the capture button c2 is represented by an icon having the shape of a camera.

The upload share button su2 is a button for uploading the image data of the screen displayed in the operation display area 120 for the shared electronic canvas cc to the content management server 6, and loading the image data to the shared electronic screen ss. The download share button sd2 is a button for downloading image data loaded in the shared electronic screen ss from the content management server 6 and displaying the image data on the operation display area 120 for the shared electronic canvas cc. The minus button r2 and the plus button e2 respectively perform the same functions as the minus button r1 and the plus button e1 in the operation display area 110, and, therefore, descriptions thereof are omitted.

Figure 9:
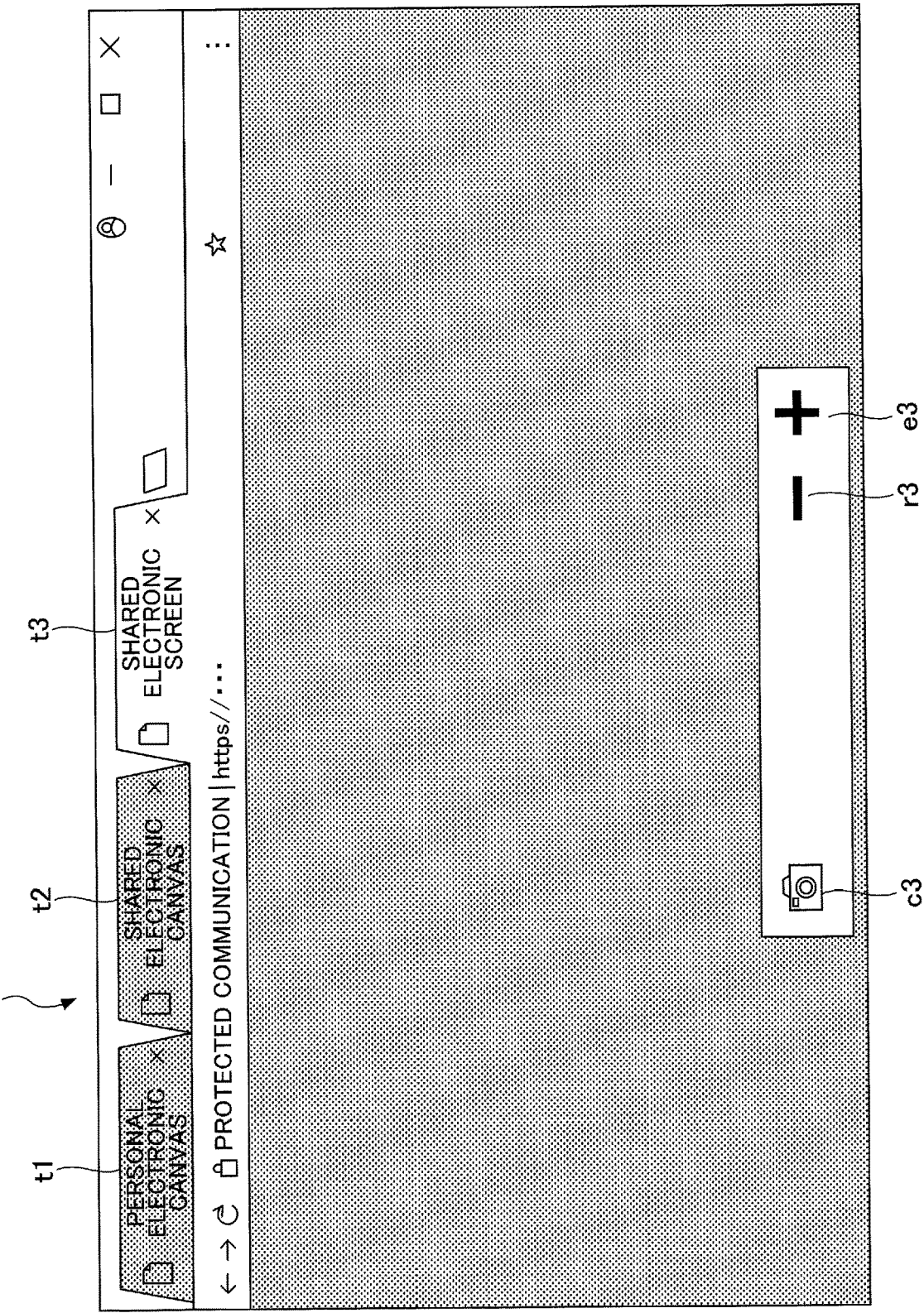
FIG. 9 is a diagram illustrating a display example of an operation display area for a shared electronic screen display according to an embodiment of the present invention.

FIG. 9 is a diagram illustrating a display example of an operation display area for displaying a shared electronic screen. As illustrated in FIG. 9, the operation display area 130 for shared electronic screen ss display is displayed as the user selects the tab t3 of the "shared electronic screen" among the three tabs t1 to t3 at the top.

At the bottom of the operation display area 130, a capture button c3, a minus button r3, and a plus button e3 are displayed. The capture button c3 is a button for capturing a screen displayed in the operation display area 130 for the shared electronic screen ss and incorporating and displaying the screen in the operation display area 120 for the shared electronic canvas cc. That is, when the capturing of the screen of the operation display area 130 for the shared electronic screen ss is started by pressing the capture button c3 of the operation display area 130 for the shared electronic screen ss, from which the image data is to be incorporated, the operation display area 120 for the shared electronic canvas cc will become the target to which the image data is to be incorporated. Here, the capture button c3 is represented by an icon having the shape of a camera.

Note that FIGS. 7 to 9 illustrate examples of switching the display of the personal electronic canvas dc, the shared electronic canvas cc, and the shared electronic screen ss by tabs t1 to t3, but the switching is not limited thereto. For example, the user interface (UI) of the information sharing system according to the present embodiment may display the personal electronic canvas dc, the shared electronic canvas cc, and the shared electronic screen ss in a single screen. Further, the information sharing system formed of the shared electronic screen ss and the personal electronic canvas dc may also have a UI that displays the shared electronic screen ss and the personal electronic canvas dc in a single screen.

Display Example of Personal Portal Screen

Next, a display example of the personal portal screen will be described with reference to FIGS. 10 to 14. FIG. 10 is a diagram illustrating an example of a display of the personal portal screen. A personal portal screen 5000 of FIG. 10 displays a conference list 5010 including a conference in which a user operating the personal terminal 2 has participated and a conference selected from the conferences to be attended as described below and for which a "personal memo dm" and the like has been created. The conference list 5010 can be created using the user DB 6003 of FIG. 6A, the personal memo management DB 6004 of FIG. 6B, and the shared memo management DB 6005 of FIG. 6C, as described below.

In the example of the conference list 5010 of FIG. 10, for each conference, the date and time, the conference name, the location, a personal memo button 5030, a shared memo button 5040, self-evaluation, and a bibliographic information button 5050 are displayed as items. The personal portal screen 5000 of FIG. 10 allows the user to confirm the 15' conference list 5010, including the conferences in which the user has participated and the conferences selected from the conferences to be attended and for which the "personal memo dm" and the like has been created, as will be described later. Self-evaluation is an example of evaluation information.

Note that the personal memo button 5030 is linked to a personal memo screen 5300 for displaying the personal memo dm of the conference. The shared memo button 5040 is linked to a shared memo screen 5400 that displays the shared memo cm of the conference. The bibliographic information button 5050 is linked to a bibliographic information display screen 5200 that displays the bibliographic information of the conference.

The personal portal screen 5000 also displays a search field 5020 for accepting a character search request from a user. The user operating the personal terminal 2 may input characters in the search field 5020 to search for a conference having a personal memo dm, a shared memo cm, or bibliographic information including the characters input to the search field 5020, and display the retrieved conference as in a personal portal screen 5100 of FIG. 11.

Figure 11:
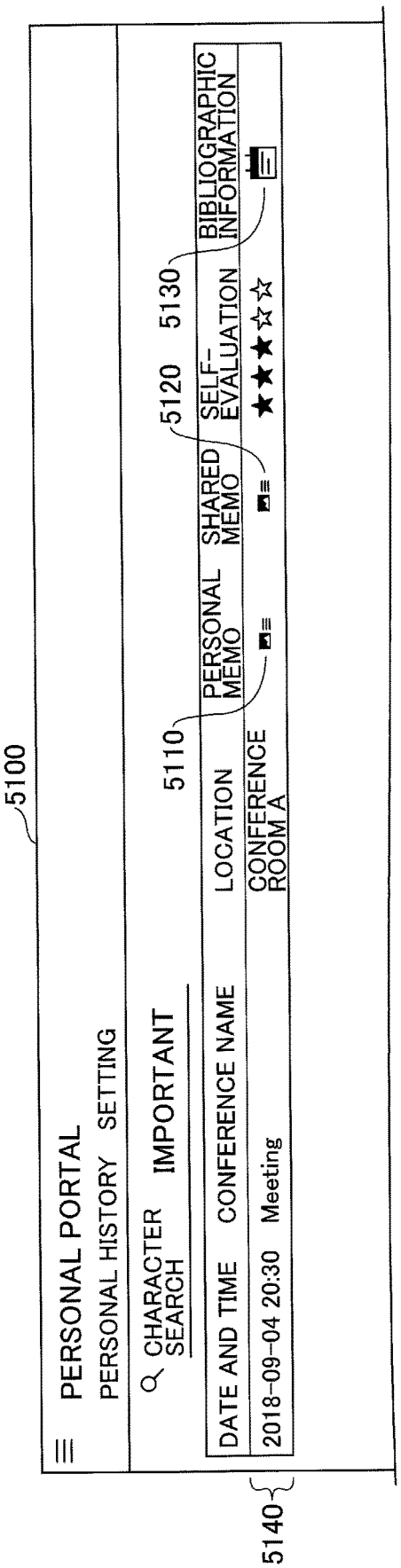
FIG. 11 is a diagram illustrating a display example of a personal portal screen in which search results according to an embodiment of the present invention are displayed.

FIG. 11 is a diagram illustrating an example of a display of the personal portal screen on which a search result is displayed. A search result 5140 of the personal portal screen 5100 of FIG. 11 illustrates items similar to the conference list 5010 of FIG. 10. That is, in the example of the search result 5140 of FIG. 11, the date and time, the conference name, the location, a personal memo button 5110, a shared memo button 5120, self-evaluation, and a bibliographic information button 5130 are displayed as items for each retrieved conference.

Therefore, the user operating the personal terminal 2 can transition to the bibliographic information display screen 5200, the personal memo screen 5300, and the shared memo screen 5400, not only from the personal portal screen 5000 before the search but also from a personal portal screen 5100 after search. Here, an example of transitioning to the bibliographic information display screen 5200, the personal memo screen 5300, and the shared memo screen 5400 from the personal portal screen 5100 after search of FIG. 11, will be described.

Figure 12:
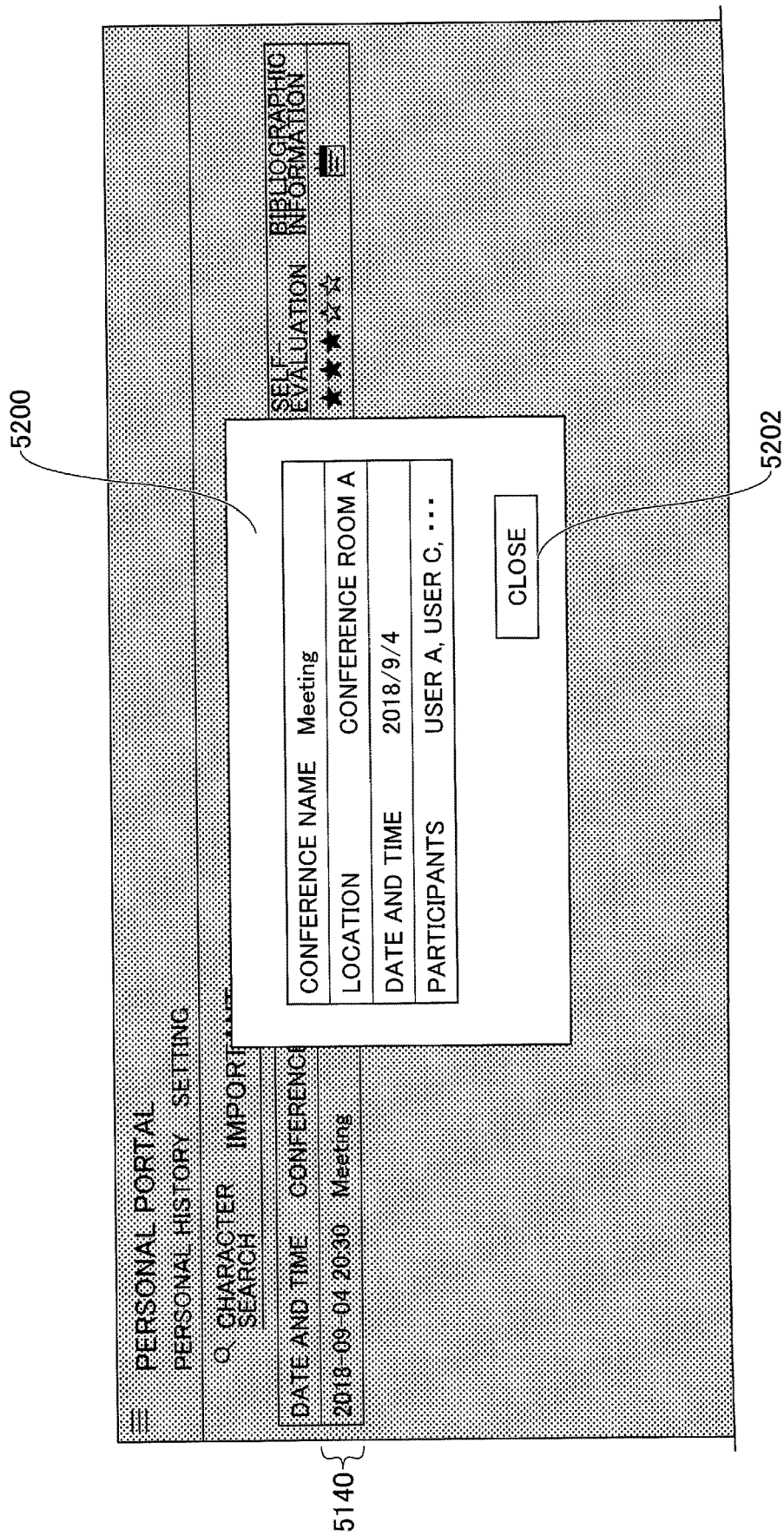
FIG. 12 is a diagram illustrating a display example of a bibliographic information display screen according to an embodiment of the present invention.

When the bibliographic information button 5130 of the personal portal screen 5100 of FIG. 11 is pressed, the personal terminal 2 displays the bibliographic information display screen 5200, for example, as illustrated in FIG. 12. FIG. 12 is a diagram illustrating a display example of the bibliographic information display screen. The bibliographic information displayed on the bibliographic information display screen 5200 is, for example, information of the shared memo management DB 6005 of FIG. 6C. The bibliographic information display screen 5200 of FIG. 12 allows the user to select a desired conference based on the bibliographic information.

Figure 13:
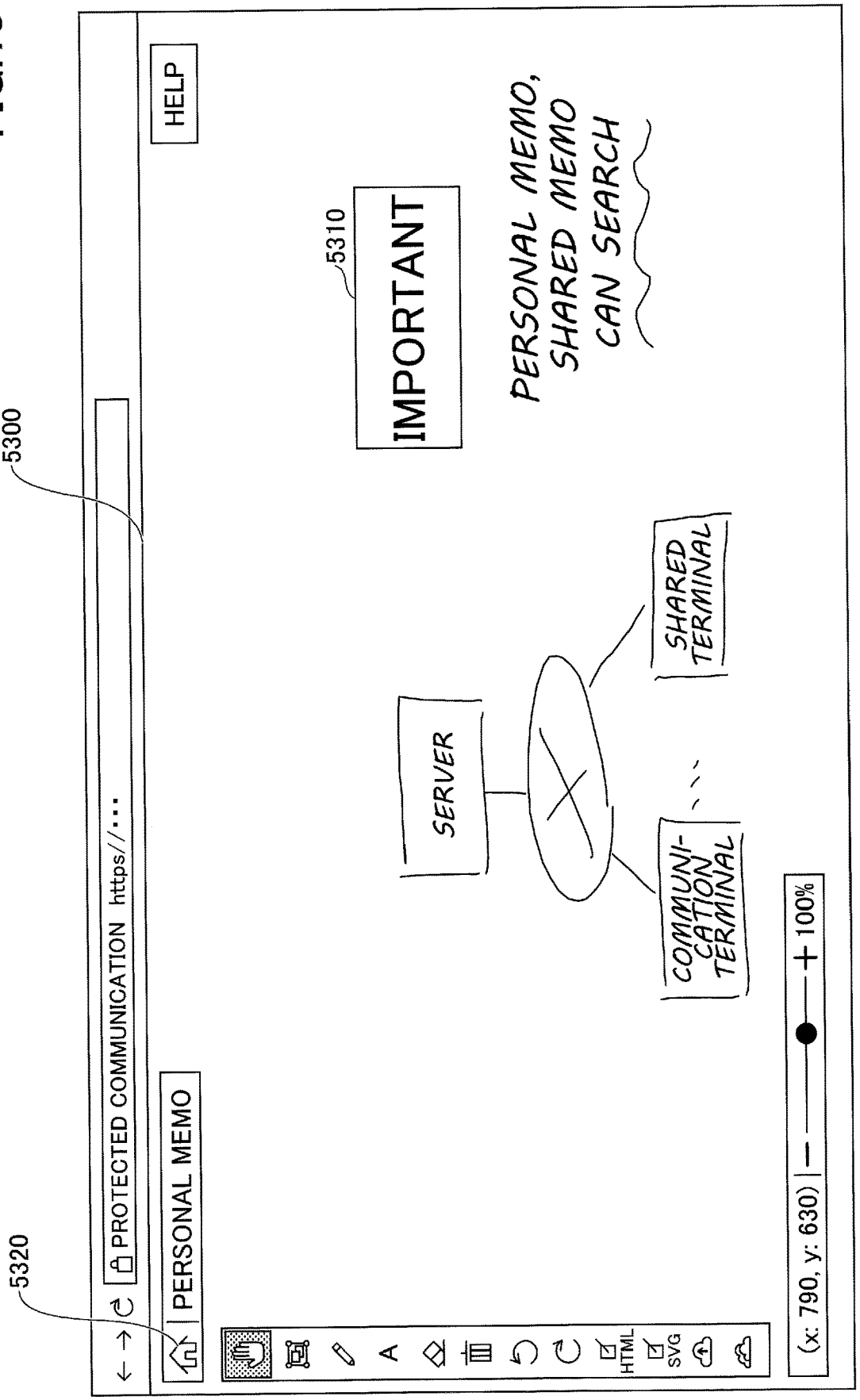
FIG. 13 is a diagram illustrating a display example of a personal memo screen according to an embodiment of the present invention.

When the personal memo button 5110 of the personal portal screen 5100 of FIG. 11 is pressed, the personal terminal 2 displays the personal memo screen 5300, for example, as illustrated in FIG. 13. FIG. 13 is a diagram illustrating a display example of the display of the personal memo screen. The personal memo displayed in the personal memo screen 5300 is, for example, the data of the personal memo DB 6001 of FIG. 5A.

In the personal memo screen 5300 of FIG. 13, a home button 5320 is displayed, and when the home button 5320 is pressed, the screen returns to the personal portal screen 5100 of FIG. 11. The personal memo screen 5300 of FIG. 13 allows the user to display the personal memo dm of the desired conference.

Figure 14:
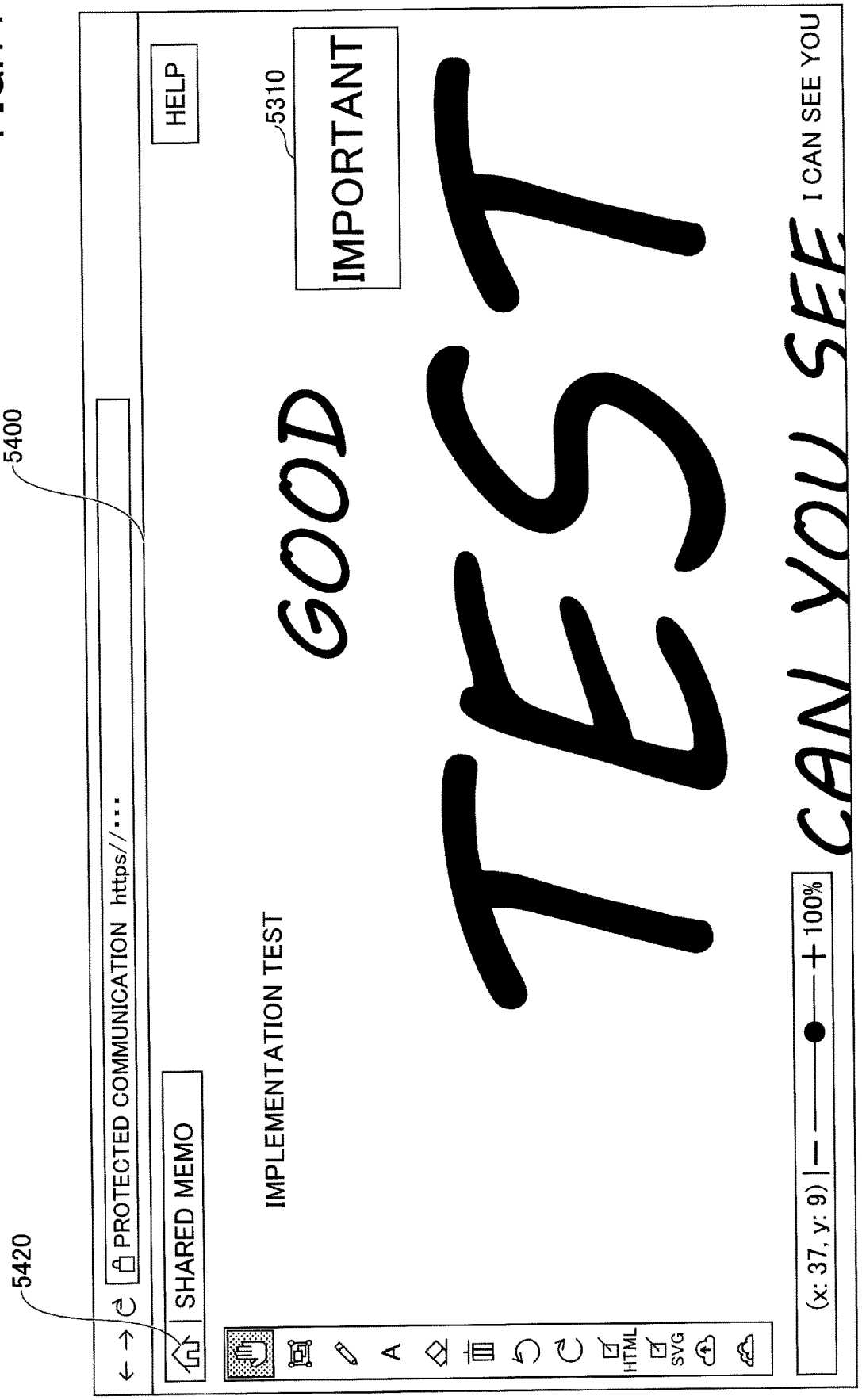
FIG. 14 is a diagram illustrating a display example of a shared memo screen according to an embodiment of the present invention.

When the shared memo button 5120 of the personal portal screen 5100 of FIG. 11 is pressed, the personal terminal 2 displays the shared memo screen 5400, for example, as illustrated in FIG. 14. FIG. 14 is a diagram illustrating a display example of the display of the shared memo screen. The shared memo displayed on the shared memo screen 5400 is, for example, the data of the shared memo DB 6002 of FIG. 5B.

In the shared memo screen 5400 of FIG. 14, a home button 5420 is displayed, and when the home button 5420 is pressed, the screen returns to the personal portal screen 5100 of FIG. 11. The shared memo screen 5400 of FIG. 14 allows the user to display the shared memo cm of the desired conference.

<Process or Operation>

Next, the process or operation according to the present embodiment will be described. In the present embodiment, an example of executing, from the personal portal screen 5000 in FIG. 10, a search of the personal memo dm and the shared memo cm edited during a conference held in a virtual room, will be described.

Figure 15:
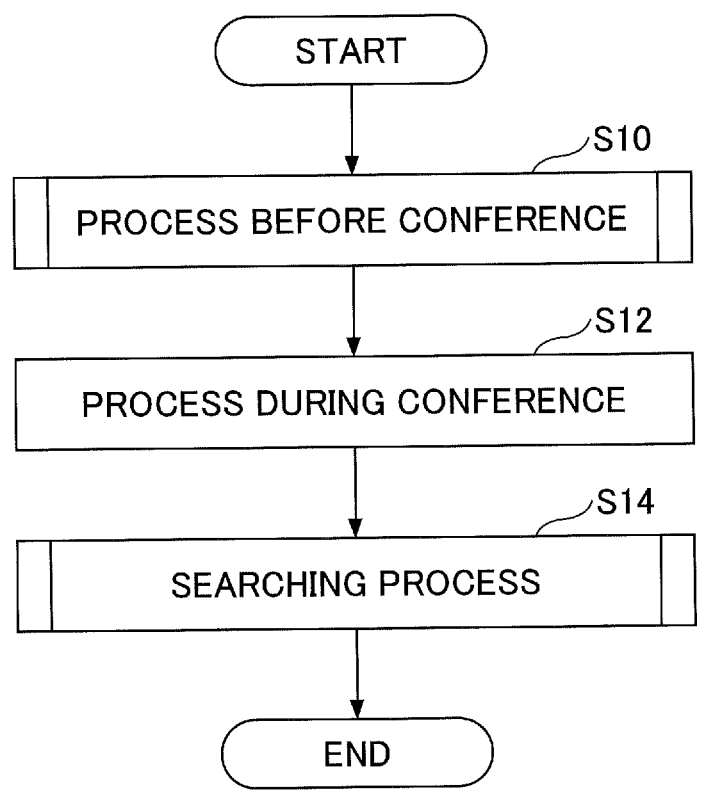
FIG. 15 is an example of a flowchart illustrating the processes of the information sharing system according to an embodiment of the present invention.

FIG. 15 is an example flowchart illustrating a process of the information sharing system according to the present embodiment. In step S10, a process before the conference is performed in the information sharing system. The process before the conference involves the generation of conference information, the creation of a virtual room, and the creation of a shared electronic screen ss, a shared electronic canvas cc, and a personal electronic canvas dc in the virtual room.

Proceeding to step S12, in the information sharing system, a user that has participated in the virtual room from the personal terminal 2 performs a process during the conference, such as editing the shared electronic screen ss, the shared electronic canvas cc, and the personal electronic canvas dc of the virtual room. Proceeding to step S14, the information sharing system accepts a request for a character search with respect to the personal memo dm, the shared memo cm, and the like, from a participant who has participated in the conference, and performs a search process for returning a search result.

(Step S10: Process Before Conference)

Figure 16:
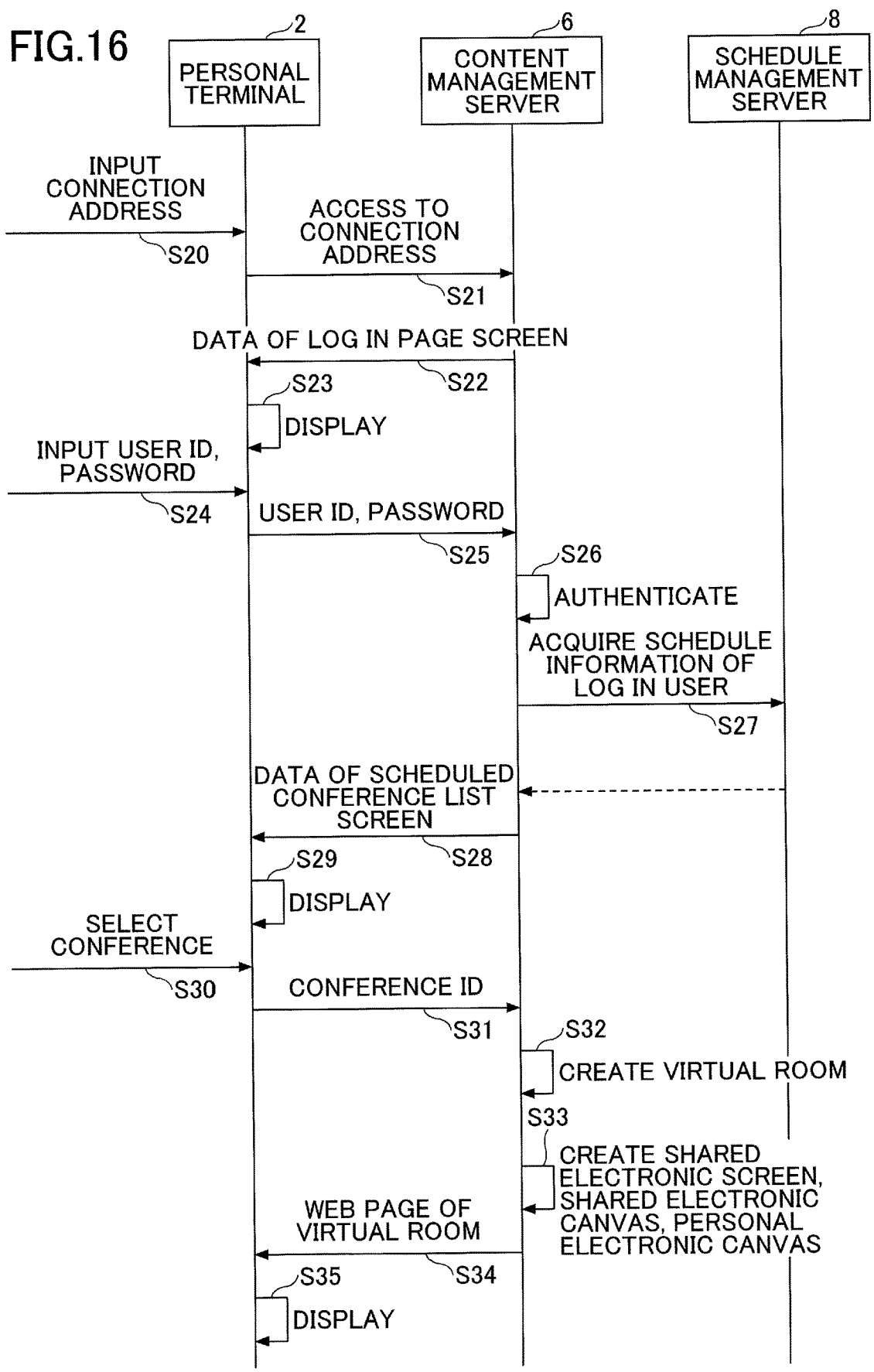
FIG. 16 is an example of a sequence diagram of a process before a conference according to an embodiment of the present invention.

FIG. 16 is a sequence diagram of an example of a process before the conference. In step S20, the user operating the personal terminal 2 inputs the connection address for connecting to the service provided by the content management server 6, in the web browser. For example, the connection address for connecting to the service provided by the content management server 6 may be displayed in the shared terminal 4 of the conference room X illustrated in FIG. 1, to be reported to the users participating in the conference, or may be stored as a bookmark of the web browser of the personal terminal 2. Further, the shared terminal 4 may also display an address bar 5500 such as that illustrated in FIG. 17, to report the connection address to users participating in the conference.

Figure 17:
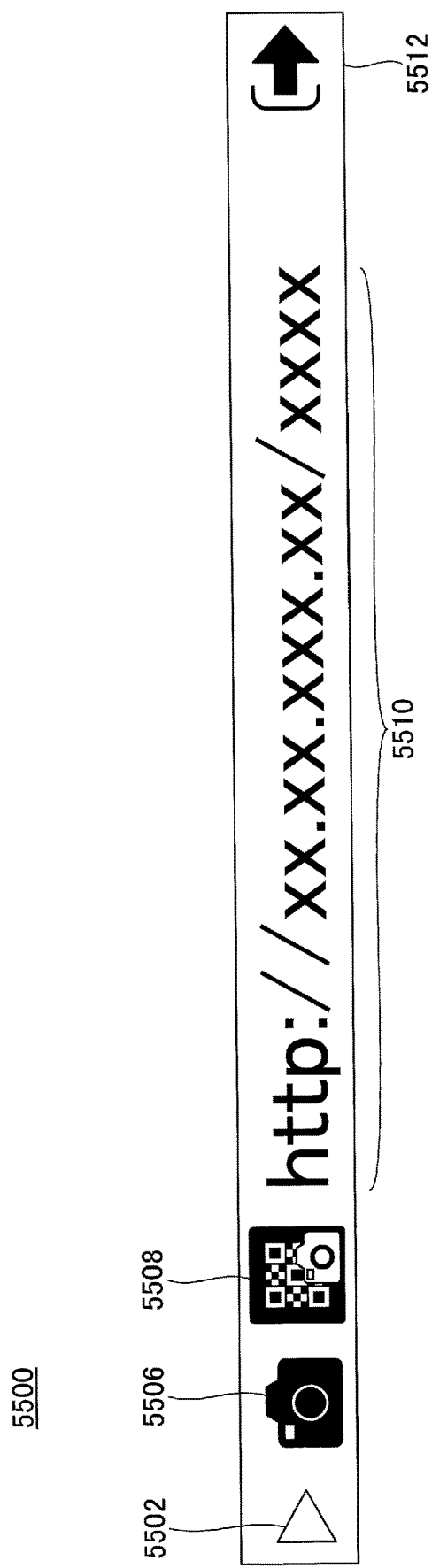
FIG. 17 is an image diagram of an example of an address bar displayed on a shared terminal according to an embodiment of the present invention.

FIG. 17 is an image diagram of an example of an address bar displayed in a shared terminal. The address bar 5500 of FIG. 17 includes a button 5502, a capture button 5506, a two-dimensional code display button 5508, a connection address 5510, and an exit button 5512.

The button 5502 is a button that omits/displays the portion of the address bar 5500 on the right of the button 5502. The capture button 5506 is a button that captures the screen of the shared electronic screen ss and pastes the screen to the shared memo cm or the personal memo dm. The two-dimensional code display button 5508 is a button that displays the connection address 5510 by a two-dimensional code. The user can capture the two-dimensional code with the personal terminal 2, to input the connection address 5510 for connecting to the service provided by the content management server 6, into the web browser. The connection address 5510 is a connection address for connecting to the service provided by the content management server 6. The exit button 5512 is a button for exiting from the virtual room of the conference in which the shared terminal 4 is participating.

The address bar 5500 is displayed by an application installed in the shared terminal 4 (including a case where the application is installed in a stick PC and the like connected to the shared terminal 4). Similar functions may be implemented by a web application. Further, the application installed in the shared terminal 4 may be provided by using a cloud service.

Note that when the user who participates in the conference knows the address (portal, scheduled conference list screen, etc.) for connecting to the service provided by the content management server 6 in advance, the shared terminal 4 is not an essential element in the configuration. In a configuration in which the shared terminal 4 is not provided, when the user who participates in the conference wishes to display the shared screen on a large screen, the personal terminal 2 sharing the screen may output the shared screen to a projector, a display, an electronic whiteboard and the like. As described above, when the personal terminal 2 has a web browser, there is an advantageous effect that a conference to which a service is provided by the content management server 6 can be performed, without a special device.

Proceeding to step S21, the web browser of the personal terminal 2 accesses the connection address 5510 that has been input. Proceeding to step S22, the content management server 6 transmits the data of the log in page screen to the personal terminal 2. In step S23, the web browser of the personal terminal 2 displays the log in page screen.

In step S24, the user operating the personal terminal 2 inputs the user ID and password in the log in page screen. The user ID and password to be input here may be, for example, authentication information for the service provided by the content management server 6, or authentication information for another service associated with the authentication information for the service provided by the content management server 6.

Proceeding to step S25, the web browser of the personal terminal 2 requests to log into the content management server 6 with the input user ID and password. Proceeding to step S26, the content management server 6 uses the authentication information, for example, illustrated in FIG. 18, to perform an authentication process with respect to the user operating the personal terminal 2.

FIG. 18 is a configuration diagram of an example of authentication information. For example, the authentication information illustrated in FIG. 18 is stored in the storage unit 6000 of the content management server 6. In the authentication information of FIG. 18, the authentication information for the service provided by the content management server 6 and the authentication information for one or more schedule management services provided by the schedule management server 8, etc., are associated with each other.

The content management server 6 determines that authentication is successful when the set of the user ID and password for which a request to log in has been made in step S25, is included in the authentication information of FIG. 18, and determines that authentication is unsuccessful when the set of the user ID and password for which a request to log in has been made in step S25, is not included in the authentication information of FIG. 18. Here, the description is continued assuming that authentication has been successful. The content management server 6 proceeds to step S27 and acquires the schedule information of the user (logged-in user) from the schedule management server 8 by, for example, the user ID and password for the schedule management service of the user for which the authentication has been successful in step S26.

The user's schedule information acquired in step S27 includes, for example, bibliographic information of the conference in which the user is scheduled to participate. Accordingly, the content management server 6 can acquire the bibliographic information of the conference in which the user is scheduled to participate.

Figure 19:
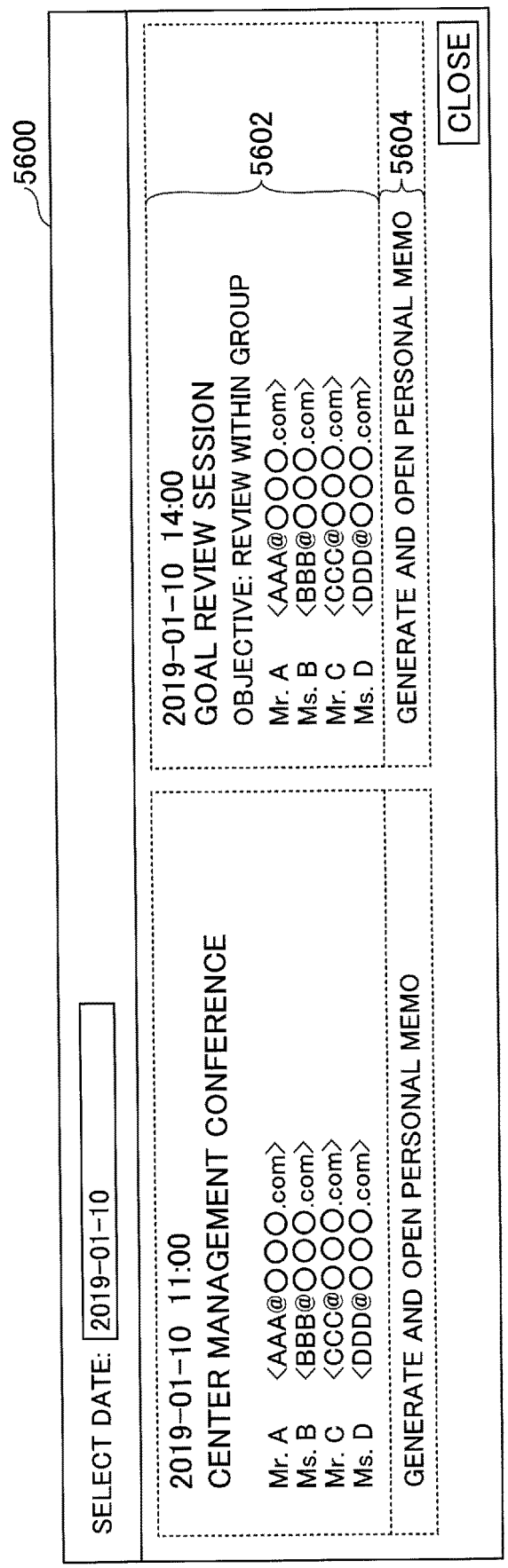
FIG. 19 is a diagram illustrating a display example of a scheduled conference list screen according to an embodiment of the present invention.

Proceeding to step S28, the content management server 6 creates data of the web page of, for example, a scheduled conference list screen 5600 of FIG. 19 from the user's schedule information acquired in step S27, and transmits the data to the personal terminal 2. Proceeding to step S29, the personal terminal 2 displays the scheduled conference list screen 5600 as illustrated in FIG. 19.

FIG. 19 is a diagram illustrating a display example of the scheduled conference list screen according to the present embodiment. In the scheduled conference list screen 5600 of FIG. 19, a list 5602 of conferences in which the user operating the personal terminal 2 is scheduled to participate (list of conferences to be attended 5602), is displayed. Further, the scheduled conference list screen 5600 of FIG. 19 is provided with a "generate and open personal memo" button 5604, for each conference in which the user operating the personal terminal 2 is scheduled to participate. The user operating the personal terminal 2 can select one of the conferences in which the user is scheduled to participate by pressing the "generate and open personal memo" button 5604, and participate in the selected conference. Accordingly, the "generate and open personal memo" button 5604 of FIG. 19 may be denoted as a "participate in conference" button.

Also, "generate and open personal memo" button 5604 of FIG. 19 may not be displayed for a conference for which the personal memo dm has been created, and an "open personal memo" button may be provided instead of the "generate and open personal memo" button 5604. Further, the scheduled conference list screen 5600 of FIG. 19 may also be provided with a "generate and open shared memo" button, or a "generate and open shared memo" button may be provided instead of the "generate and open personal memo" button 5604. Note that also when the "generate and open shared memo" button is pressed, the same process as in step S32 described below is performed.

Proceeding to step S30, the user operating the personal terminal 2 selects one conference from the conferences to be attended by pressing the "generate and open personal memo" button 5604. Proceeding to step S31, the personal terminal 2 transmits the conference ID of the conference selected from the conferences to be attended by the user operating the personal terminal 2, to the content management server 6. Note that the conference ID of step S31 is an example of identification information that uniquely identifies the conference.

In step S32, the content management server 6 creates a virtual room, for example, as illustrated in FIG. 1, and in step S33, the content management server 6 creates the shared electronic screen ss, the shared electronic canvas cc, and the personal electronic canvas dc.

Note that in step S33, when the virtual room illustrated in FIG. 1 has been created by another user who participates in the same conference, the shared electronic screen ss and the shared electronic canvas cc have already been created, and, therefore, the personal electronic canvas dc is to be created. Proceeding to step S34, the content management server 6 generates data of the web page of the virtual room as illustrated in FIGS. 7 to 9, and transmits the data to the personal terminal 2.

In step S35, the web browser of the personal terminal 2 displays the received web page of the virtual room, so that it is possible to view the shared electronic screen ss, edit the personal memo dm, and edit the shared memo cm.

For example, in step S35, the operation display area 110 for displaying the personal electronic canvas dc as illustrated in FIG. 7 is displayed. Accordingly, the user operating the personal terminal 2 can easily display the operation display area 110 for displaying the personal electronic canvas dc of the conference selected from the list of conferences to be attended 5602.

Note that FIG. 16 illustrates the process performed when a virtual room has not been created and the "generate and open personal memo" button 5604 of the scheduled conference list screen 5600 is pressed and a conference is selected. In a process performed when a virtual room has already been created by another user and the "generate and open personal memo" button 5604 of the scheduled conference list screen 5600 is pressed and a conference is selected, the creation of a virtual room in step S32, the creation of the shared electronic screen ss and the creation of the shared electronic canvas cc in step S33, are omitted. On the other hand, the creation of the personal electronic canvas dc in step S33 is executed without being omitted because the personal electronic canvas dc is for the exclusive use of each person.

(Step S12: Process During Conference)

Figure 20:
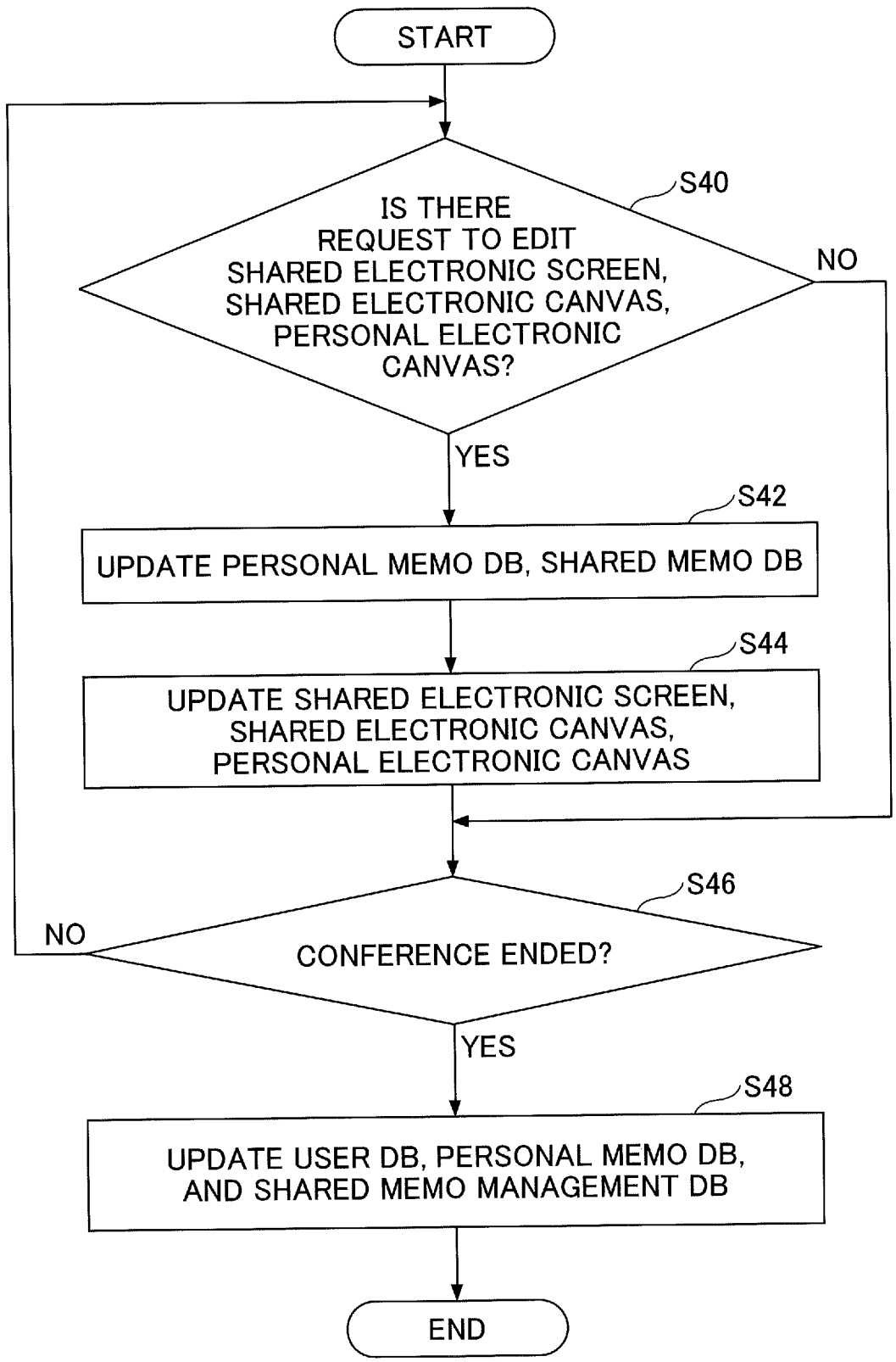
FIG. 20 is a flowchart illustrating an example of a process during a conference according to an embodiment of the present invention.

FIG. 20 is a flowchart of an example of a process during a conference. In step S40, the content management server 6 determines whether a request to edit the shared electronic screen ss, the shared electronic canvas cc, and the personal electronic canvas dc of the virtual room has been accepted from the personal terminal 2 of the user who has participated in the virtual room.

When it is determined that the request is accepted, the content management server 6 performs the processes of steps S42 and S44. In step S42, the content management server 6 updates the personal memo DB 6001 and the shared memo DB 6002 in response to the editing request. In step S44, the content management server 6 updates the display of the shared electronic screen ss, the shared electronic canvas cc, and the personal electronic canvas dc in the virtual room in response to the editing request.

As a result of the processes in steps S42 and S44, in the personal terminals 2 of the users participating in the same virtual room, the same contents are displayed in the shared electronic screen ss and the shared electronic canvas cc, and the personal electronic canvas dc exclusively used by each user is displayed. The processes of steps S40 to S46 are repeated until the conference in the virtual room is ended.

When the conference in the virtual room is ended, the content management server 6 proceeds to step S48 and updates the user DB 6003 of FIG. 6A, the personal memo management DB 6004 of FIG. 6B, and the shared memo management DB 6005 of FIG. 6C. For example, the content management server 6 stores the user ID of the user who has participated in the conference and the personal memo ID of the user's personal memo dm in association with each other, in the user DB 6003 of FIG. 6A. Further, the content management server 6 stores the personal memo ID of the user who has participated in the conference, the shared memo ID of the shared memo cm edited jointly by the users who have participated in the conference, and the memo data that is the information of the characters described in the personal memo dm identified by the personal memo ID, in association with each other, in the personal memo management DB 6004 of FIG. 6B. For example, the content management server 6 stores the text data described in the personal memo dm or the text data extracted from the handwritten characters by optical character recognition, as the memo data. Further, the content management server 6 stores the shared memo ID of the shared memo cm jointly edited by the users who have participated in the conference and the bibliographic information of the conference, in association with each other, in the shared memo management DB 6005 of FIG. 6C.

Note that FIG. 20 illustrates an example in which the process of step S48 is performed at the time when the conference in the virtual room has ended; however, this process may be performed whenever a user exits the virtual room. As described above, by performing the process of step S48, it is possible to address the case where a user who has exited the virtual room immediately wishes to review the contents of the conference, even when the conference in the virtual room is ongoing.

(Step S14: Searching Process)

Figure 21:
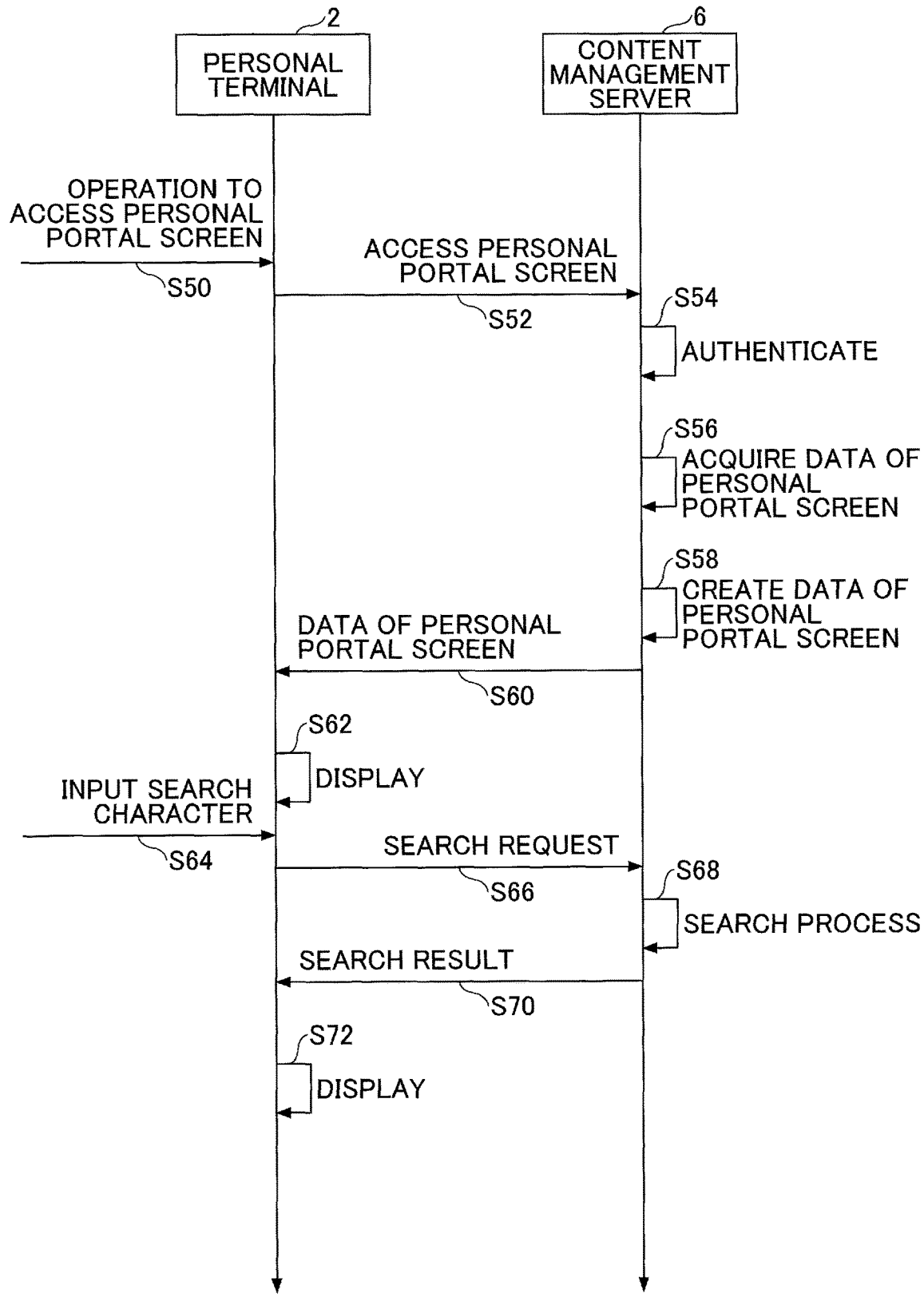
FIG. 21 is a sequence diagram illustrating an example of a searching process according to an embodiment of the present invention.

FIG. 21 is a sequence diagram illustrating an example of a searching process. In step S50, the user operating the personal terminal 2 performs an operation to access the personal portal screen 5000. The operation to access the personal portal screen 5000 may be to input a connection address for connecting to the personal portal screen 5000 into the web browser or to select the personal portal screen 5000 by using a bookmark.

Proceeding to step S52, the web browser of the personal terminal 2 accesses the personal portal screen 5000. In step S54, the content management server 6 performs an authentication process with respect to the user operating the personal terminal 2. Here, the description is continued assuming that authentication has been successful. The content management server 6 proceeds to step S56 and reads data for the personal portal screen 5000 from the storage unit 6000.

Specifically, the content management server 6 identifies the personal memo ID of the user from the user DB 6003 of the storage unit 6000 by using the user ID of the authenticated user as a key. Further, the content management server 6 identifies the shared memo ID from the personal memo management DB 6004 of the storage unit by 6000 by using the identified personal memo ID as a key. Further, the content management server 6 identifies the bibliographic information of the conference from the shared memo management DB 6005 of the storage unit 6000 by using the identified shared memo ID as a key.

As described above, when the user ID of the user can be identified, the content management server 6 can acquire data for the personal portal screen 5000 necessary for creating a list of conferences in which the user has participated, from the user DB 6003, the personal memo management DB 6004, and the shared memo management DB 6005 of the storage unit 6000.

Proceeding to step S58, the content management server 6 creates data of a web page of the personal portal screen 5000 from data for the acquired personal portal screen 5000.

Proceeding to step S60, the content management server 6 transmits data of the web page for the personal portal screen 5000 to the personal terminal 2.

Proceeding to step S62, the personal terminal 2 can display the personal portal screen 5000 as illustrated in FIG. 22. FIG. 22 is a diagram illustrating a display example of the personal portal screen according to the present embodiment. The personal portal screen 5000 of FIG. 22 displays the conference list 5010 including a conference in which a user operating the personal terminal 2 has participated and a conference having the conference name "center management conference" selected from the scheduled conference list screen 5600 of FIG. 19 and for which the "personal memo dm" and the like has been created.

Figure 23:
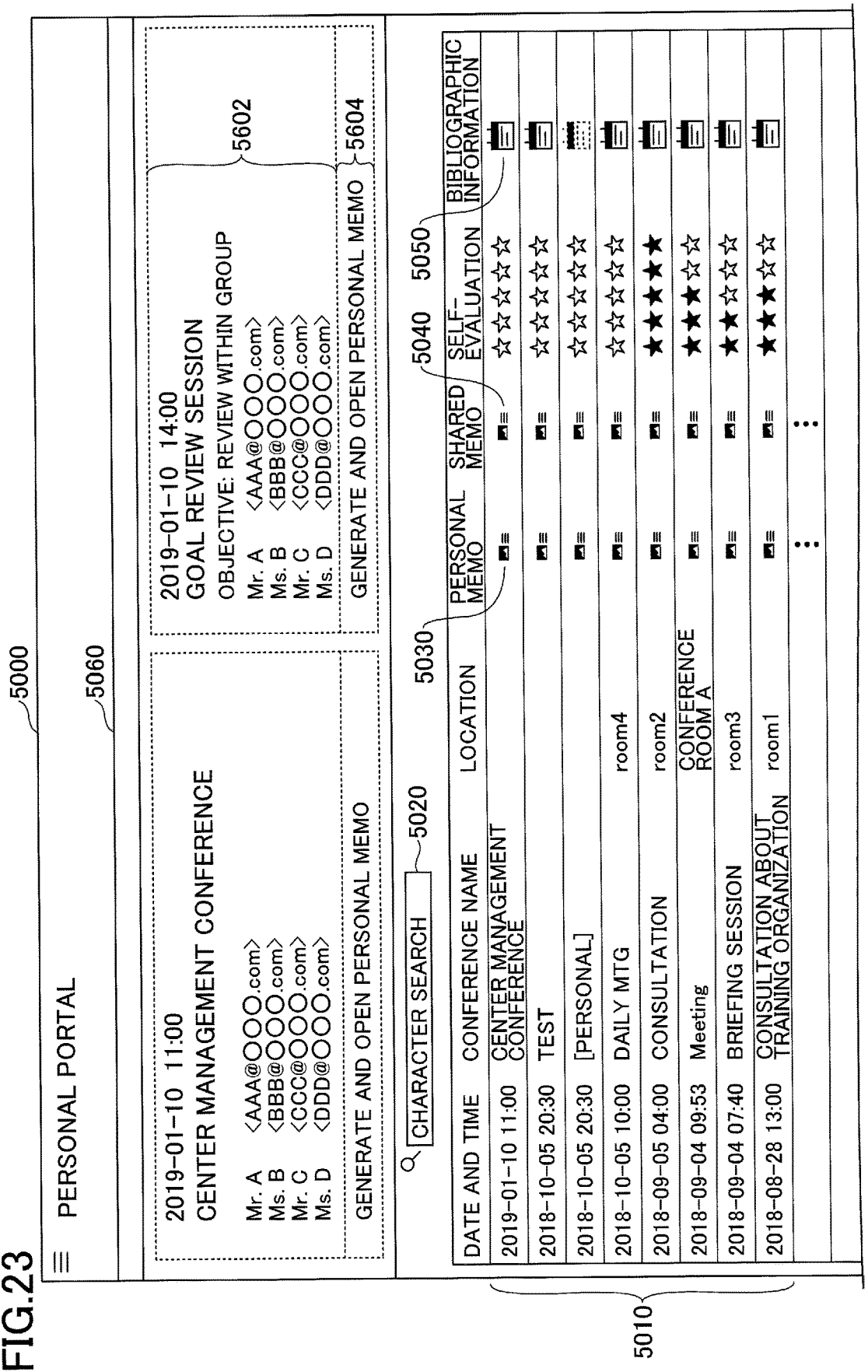
FIG. 23 is a diagram illustrating a display example of a personal portal screen according to an embodiment of the present invention.

Note that the personal terminal 2 may display the personal portal screen 5000, for example, as illustrated in FIG. 23, instead of the personal portal screen 5000 as illustrated in FIG. 22. FIG. 23 is a diagram illustrating a display example of the personal portal screen according to the present embodiment. The personal portal screen 5000 of FIG. 23 is an example of a screen combining the personal portal screen 5000 of FIG. 22 and the scheduled conference list screen 5600 of FIG. 19.

In the personal portal screen 5000 of FIG. 23, the list of conferences in which a user operating the personal terminal 2 is scheduled to participate (the list of conferences to be attended 5602) and the "generate and open personal memo" button 5604 for each conference in which the user is scheduled to participate are provided. A user operating the personal terminal 2 may press the "generate and open personal memo" button 5604 to create a "personal memo dm" of the selected conference in which the user is scheduled to participate, and display the operation display area 110 for displaying the personal electronic canvas dc of the conference.

Further, the user operating the personal terminal 2 may press the "generate and open personal memo" button 5604 to additionally display the selected conference to be attended in the conference list 5010.

For example, there may be a case where there are many conferences included in the conference list 5010 and the user may want to narrow down the conferences by character searching. Further, it may not be possible to determine the desired conference by the information displayed in the conference list 5010. In such a case, the user can use the search function of the personal portal screen 5000.

In step S64, the user operating the personal terminal 2 inputs search characters in the search field 5020. Proceeding to step S66, the web browser of the personal terminal 2 specifies the search characters input to the search field 5020 and makes a search request to the content management server 6. Proceeding to step S68, the content management server 6 performs a searching process based on the specified search characters.

Figure 24:
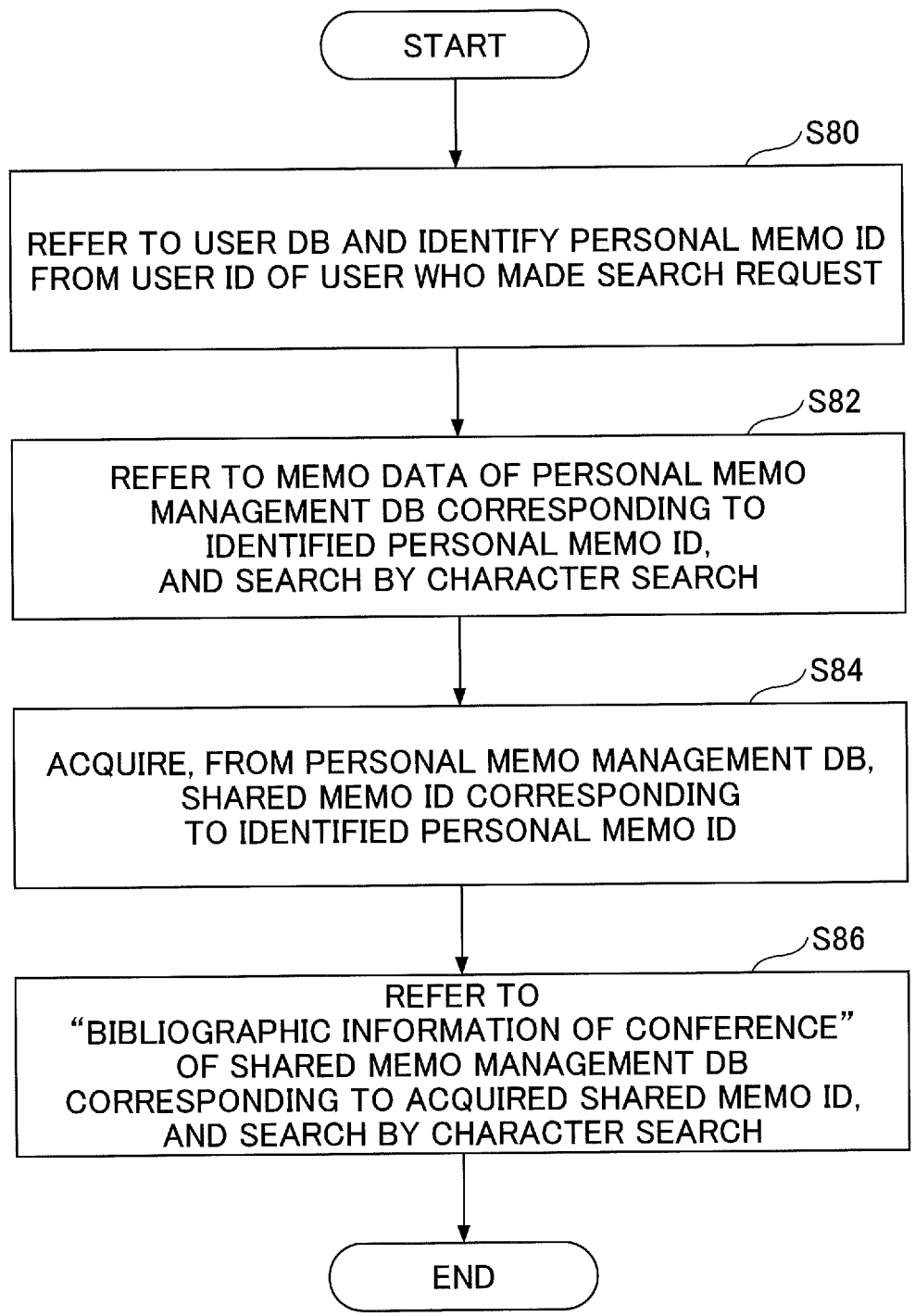
FIG. 24 is a flowchart illustrating an example of a searching process of step S68 according to an embodiment of the present invention.

FIG. 24 is a flowchart illustrating an example of the searching process of step S68. In step S80, the searching unit 67 of the content management server 6 refers to the user DB 6003 of FIG. 6A and identifies the personal memo ID from the user ID of the user who has made the search request. The personal memo ID identified here is the personal memo ID of the personal memo dm edited in the conference by the user who has made the search request.

In step S82, the searching unit 67 refers to the memo data in the personal memo management DB 6004 of FIG. 6B corresponding to the personal memo ID identified in step S80, and performs searching by using the search characters. The memo data of the personal memo management DB 6004 illustrated in FIG. 6B is text data included in the personal memo dm described in the personal electronic canvas dc by the user or text data extracted from handwritten characters by optical character recognition. Therefore, the user can search for the conference for which the search characters are included in the corresponding personal memo dm.

For example, the personal memo screen 5300 of FIG. 13 includes text characters 5310 of "IMPORTANT", and, therefore, the memo data of the personal memo ID corresponding to the personal memo screen 5300 has contents as illustrated in FIG. 6B.

Proceeding to step S84, the searching unit 67 acquires the shared memo ID corresponding to the personal memo ID identified in step S80, from the personal memo management DB 6004 illustrated in FIG. 6B. The shared memo ID acquired here is the shared memo ID of the shared memo cm, which has been jointly edited by the participants at the conference in which the user who has made the search request has participated.

In step S86, the searching unit 67 refers to "bibliographic information of the conference" of the shared memo management DB 6005 of FIG. 6C, which corresponds to the shared memo ID identified in step S84, and performs searching by using the search characters. "Bibliographic information of the conference" in the shared memo management DB 6005 in FIG. 6C is bibliographic information of a conference in which the user has participated or a conference selected from the scheduled conference list screen 5600, etc., of FIG. 19 and for which the "personal memo dm" and the like has been created. Thus, the user can search for a conference for which the bibliographic information includes the search characters, from conferences included in the conference list 5010.

Returning to step S70 of FIG. 21, the searching unit 67 transmits the search result of step S68, i.e., the conference for which the search characters are included in the bibliographic information or the personal memo dm, among the conferences included in the conference list 5010, as a search result to the personal terminal 2. Then, proceeding to step S72, the personal terminal 2 can display the personal portal screen 5100 including the search result 5140 as illustrated in FIG. 11.

As described above, in the information sharing system according to the present embodiment, as illustrated on the personal portal screen 5000 in FIG. 10, etc., it is easy to transition from the conference list 5010, which includes the conference in which the user has participated and the conference selected from the conferences to be attended and for which the "personal memo dm", etc., has been created, to the bibliographic information display screen 5200, the personal memo screen 5300, and the shared memo screen 5400 of each conference.

Further, in the information sharing system according to the present embodiment, the personal portal screen 5000 has a character search function for searching the bibliographic information display screen 5200, the personal memo screen 5300, and the shared memo screen 5400 of the respective conferences, and, therefore, the desired conference can be easily identified.

Other Embodiments

While embodiments of the present invention have been described, the present invention is not limited to such embodiments, and various modifications and substitutions may be made without departing from the spirit of the present invention.

For example, the first embodiment describes an example in which the information of the characters (the text or the handwritten characters) described in the shared memo cm is not a search target. However, the information of the characters described in the shared memo cm may be a search target. In this case, the shared memo management DB 6005 of FIG. 6C is configured as illustrated in FIG. 25.

FIG. 25 is a configuration diagram of an example of a shared memo management DB. In the storage unit 6000 of the content management server 6, the shared memo management DB 6005 as illustrated in FIG. 25 is formed. In the shared memo management DB, a set of memo data and bibliographic information of the conference is managed in association with a shared memo ID for identifying a shared memo. Memo data is text data included in the shared memo cm described in the shared electronic canvas cc by the user or text data extracted from handwritten characters by optical character recognition.

When a shared memo ID is identified with the shared memo management DB 6005 of FIG. 25, the bibliographic information of the conference and text data representing the contents of the characters described in the shared electronic canvas cc jointly by the users at the conference, can be identified.

Further, in the first embodiment, an example of acquiring the bibliographic information of the conference from the schedule management server 8 has been described. However, the present invention is not limited thereto, and the bibliographic information of the conference may be acquired from a conference reservation system and the like. Further, in step S24 of FIG. 16, the user may be prompted to specify, in the log in page screen, the schedule management service for acquiring schedule information.

Further, the connection address 5510 described in the first embodiment is an example of information for accessing the service provided by the content management server 6. As long as the information can identify the service provided by the accessing content management server 6 to be accessed, the connection address 5510 may be other information such as a code, e.g., a passcode.

The present embodiment addresses the problem of the conference support system of Patent Document 1, in which it is not possible to display, other than the main conference list, a list of conferences for which various contents have been created by a personal memo function and the like, and, therefore, it has been difficult to search for various contents managed in association with the conferences.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

The shared memo cm is an example of a shared content. The personal memo dm is an example of a personal content.

According to one embodiment of the present invention, in a conference system in which information is shared by a plurality of users, it is possible to utilize conference information held by each user.

The information processing apparatus, the information processing system, and the information processing method are not limited to the specific embodiments described in the detailed description, and variations and modifications may be made without departing from the spirit and scope of the present invention.

What is claimed is:

1. An information processing apparatus comprising:
processing circuitry; and
a memory storing computer-executable instructions that cause the processing circuitry to:
create, in a web browser of a communication terminal, data of a web page for displaying the web page configured to accept a selection of a conference from a first conference list by a user;
create a conference content in association with the conference selected by the user; and
display, on the web browser displayed on a display device of the communication terminal, the conference content created in association with the conference selected by the user, such that the conference content is editable by the user,
wherein the conference content includes a shared content that is jointly editable by a plurality of users from the web browsers of a plurality of the communication terminals, and a personal content that is editable only by an individual user of each of a plurality of the communication terminals at a corresponding web browser of the web browsers.

2. The information processing apparatus according to claim 1, wherein the processing circuitry further creates data of a web page for displaying, on the web browser of the communication terminal, a second conference list, which is a list of one or more conferences for which the conference content has been created.

3. The information processing apparatus according to claim 1, wherein the processing circuitry further creates data of a web page for displaying, in the first conference list, bibliographic information of a conference in which the user is scheduled to participate, acquired from schedule information of the user.

4. The information processing apparatus according to claim 1, wherein the processing circuitry further creates data of a web page for displaying, on the web browser of the communication terminal, a second conference list configured to accept, from the user, an operation to display the conference content for each of the conferences.

5. An information processing system comprising:
a plurality of communication terminals; and
an information processing apparatus, wherein
the information processing apparatus includes:
a first processing circuitry; and
a first memory storing computer-executable instructions that cause the first processing circuitry to:
create, in a web browser of each of the plurality of communication terminals, data of a web page for displaying the web page configured to accept a selection of a conference from a first conference list by a user;
create a conference content in association with the conference selected by the user; and
display, on the web browser displayed on a display device of each of the plurality of communication terminals, the conference content created in association with the conference selected by the user, such that the conference content is editable by the user, and wherein
each of the plurality of communication terminals includes:
a second processing circuitry; and a second memory storing computer-executable instructions that cause the second processing circuitry to:
  display the web page according to the data of the web page received from the information processing apparatus,
wherein the conference content includes a shared content that is jointly editable by a plurality of users from the web browsers of a plurality of the communication terminals, and a personal content that is editable only by an individual user of each of a plurality of the communication terminals at a corresponding web browser of the web browsers.

6. An information processing method comprising:
creating, in a web browser of a communication terminal, data of a web page for displaying the web page configured to accept a selection of a conference from a first conference list by a user;
creating a conference content in association with the conference selected by the user; and
displaying, on the web browser displayed on a display device of the communication terminal, the conference content created in association with the conference selected by the user, such that the conference content is editable by the user,
wherein the conference content includes a shared content that is jointly editable by a plurality of users from the web browsers of a plurality of the communication terminals, and a personal content that is editable only by an individual user of each of a plurality of the communication terminals at a corresponding web browser of the web browsers.

* * * * *